(12) United States Patent
Ivie et al.

(10) Patent No.: US 11,941,680 B1
(45) Date of Patent: *Mar. 26, 2024

(54) SOCIAL MEDIA DATA MATCHING

(71) Applicant: Amazon Technologies, Inc., Seattle, WA (US)

(72) Inventors: Stephen Brent Ivie, Bothell, WA (US); Ashutosh Vishwas Kulkarni, Bellevue, WA (US); Saurabh Nangia, Seattle, WA (US); Adam Landry Bordelon, Seattle, WA (US); Aaron James Dykstra, Federal Way, WA (US); David Michael Hurley, Seattle, WA (US); Adam James Finkelstein, Seattle, WA (US); Scott James McKee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1126 days.

This patent is subject to a terminal disclaimer.

(21) Appl. No.: 16/551,537

(22) Filed: Aug. 26, 2019

Related U.S. Application Data

(63) Continuation of application No. 13/675,333, filed on Nov. 13, 2012, now Pat. No. 10,395,297.

(51) Int. Cl.
*G06Q 30/0601* (2023.01)
*G06Q 30/06* (2023.01)
*H04L 9/40* (2022.01)

(52) U.S. Cl.
CPC ......... *G06Q 30/0631* (2013.01); *G06Q 30/06* (2013.01); *G06Q 30/0641* (2013.01); *H04L 63/08* (2013.01)

(58) Field of Classification Search
CPC .......................... G06Q 30/06; G06Q 30/0641
See application file for complete search history.

(56) References Cited

U.S. PATENT DOCUMENTS

| | | | |
|---|---|---|---|
| 7,212,667 B1 | 5/2007 | Shin et al. | |
| 7,280,688 B2 | 10/2007 | Katsuyama | |
| 7,856,380 B1 | 12/2010 | Latin-Stoermer et al. | |
| 9,420,319 B1* | 8/2016 | Story, Jr. ............ | G06Q 30/0269 |
| 2005/0256756 A1* | 11/2005 | Lam ................. | H04N 21/25891 |
| | | | 705/7.33 |
| 2006/0066629 A1 | 3/2006 | Norlander et al. | |

(Continued)

OTHER PUBLICATIONS

Social Transparency through Recommendation Engines and its Challenges: Looking Beyond Privacy Titiriga, Remus. Informatica Economica 15.4: 147-154. Bucharest: Inforec Association. (2011). Retrieved via ProQuest (Year: 2011).*

*Primary Examiner* — Michael Misiaszek
(74) *Attorney, Agent, or Firm* — Athorus, PLLC

(57) ABSTRACT

Social network postings, including text, images or other media, may provide valuable information regarding a user of the social network with which the postings may be associated. With the authorization of the user, and upon authentication by the social network, an online marketplace may access the social network postings and extract data therefrom, and market one or more recommended items to the user based on the extracted data, which may include color pallets or texture pallets derived from photographs included in the postings.

20 Claims, 11 Drawing Sheets
(7 of 11 Drawing Sheet(s) Filed in Color)

(56) References Cited

U.S. PATENT DOCUMENTS

| | | |
|---|---|---|
| 2007/0143217 A1 | 6/2007 | Starr |
| 2009/0150330 A1 | 6/2009 | Gobeyn et al. |
| 2011/0082735 A1* | 4/2011 | Kannan ................. G06F 16/583 |
| | | 705/14.23 |
| 2012/0173324 A1 | 7/2012 | Vallery et al. |
| 2012/0278127 A1 | 11/2012 | Kirakosyan et al. |
| 2012/0290433 A1* | 11/2012 | England ............. G06Q 30/0631 |
| | | 705/26.7 |
| 2013/0300761 A1* | 11/2013 | Ahmed .............. G06Q 30/0643 |
| | | 345/595 |
| 2013/0325605 A1* | 12/2013 | Callaghan .......... G06Q 30/0251 |
| | | 705/14.66 |
| 2014/0067624 A1* | 3/2014 | Babu ................. G06Q 30/0641 |
| | | 705/27.2 |
| 2015/0170250 A1 | 6/2015 | Dalal et al. |

\* cited by examiner

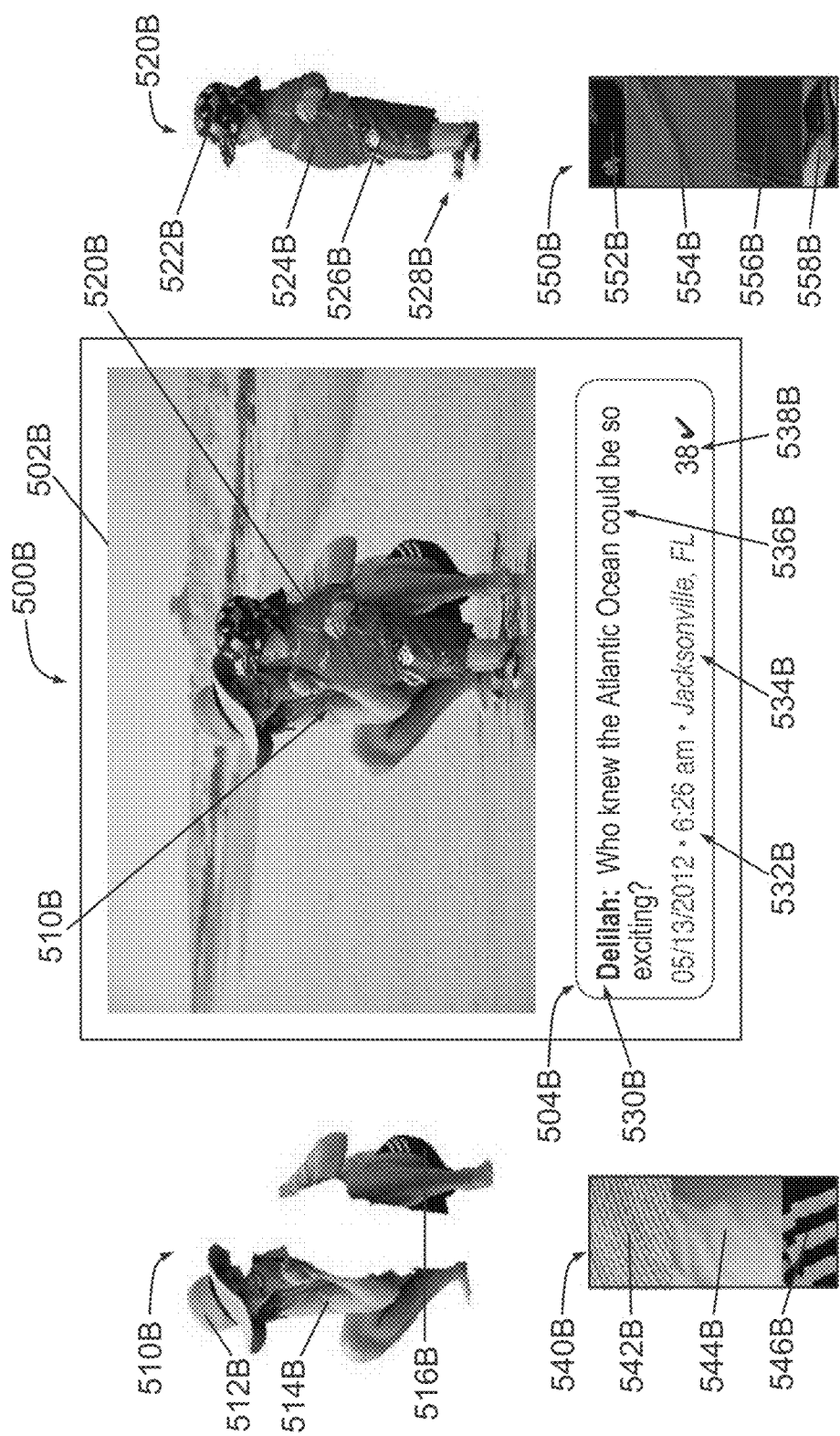

SOCIAL MEDIA DATA MATCHING

CROSS-REFERENCE TO RELATED APPLICATIONS

This application is a continuation of U.S. patent application Ser. No. 13/675,333, now U.S. Pat. No. 10,395,297, filed Nov. 13, 2012, the contents of which are incorporated by reference herein in their entirety.

BACKGROUND

Social networks have greatly elevated the breadth and intimacy of electronic communication between computer users over the Internet. For example, using a social network, a computer user may connect with friends, family members, classmates, colleagues or other known or unknown computer users who share a common trait, interest or experience with him or her, even if the users have never met before or are unlikely to ever meet in the future. Computer users may also publish information (including text, images, videos or other media) regarding their preferred activities or interests to select audiences or the general public over a social network. Furthermore, where a computer user identifies his or her background, interests or other commonalities to a social network, the social network may search for and identify other users who share the same or similar backgrounds, interests or commonalities with that user, and encourage the users to connect with one another over the social network.

Social networks typically provide smooth, easy-to-use and functional interfaces that may be customized to their members' respective levels of experience or interest, and may enable such members to fluidly share information with one another, or to learn more about one another, irrespective of the physical distance between them. Most social networks permit their members to enter, or post, information regarding themselves, their current or preferred activities or interests, or timely topics of interest. Additionally, most social networks also permit members to express their opinions on or preferences for particular issues or topics, and to provide comments or media relating to information entered or posted by themselves or by other members. With the advent and rapid proliferation of mobile communication technology, members may now access social networks from not only desktop or laptop computers, but also tablet computers and wireless telephones, or "smartphones," in virtually any location where access to the Internet is available. For each of these reasons, social networks have become wildly popular among computer users: it is presently estimated that the world's largest social network, Facebook®, has approximately one billion unique members, while the microblog Twitter® and the professional network LinkedIn® have approximately two hundred million members apiece, and the upstart Google+™ network claims to have reached the one hundred million member mark just fifteen months after its initial launch.

Given the public's widespread adoption of social networking, owners or operators of other websites have now taken steps to incorporate social networks and related features into their websites, thereby expanding the theoretical reach of social networks from their home pages to those of other, unrelated websites. For example, many social networks now permit businesses or other entities to join as members, and to publish information to their respective connections, in the same manner as a human member. Furthermore, many blogs or sports, news or commercial websites that invite commentary from users through standard means (i.e., the entry of text into text boxes or the posting of images) now permit visitors to such blogs or websites to provide comments through their respective social networking accounts, such that the comments may be made available on such blogs or websites, and also in one or more postings on their social networking accounts. Moreover, many such blogs or websites now permit users to express their interest in or preference for features on such blogs or websites through their social networking accounts, such as by providing clickable or selectable features on their blogs or websites that are consistent with or identical to such features on the social network websites, or by enabling users to circulate links to the blogs or websites to their friends or connections across the social network with a touch of a button.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A, 5B and 5C are exemplary social media postings and data extracted therefrom, in accordance with embodiments of the present disclosure.

DETAILED DESCRIPTION

Figure 1:
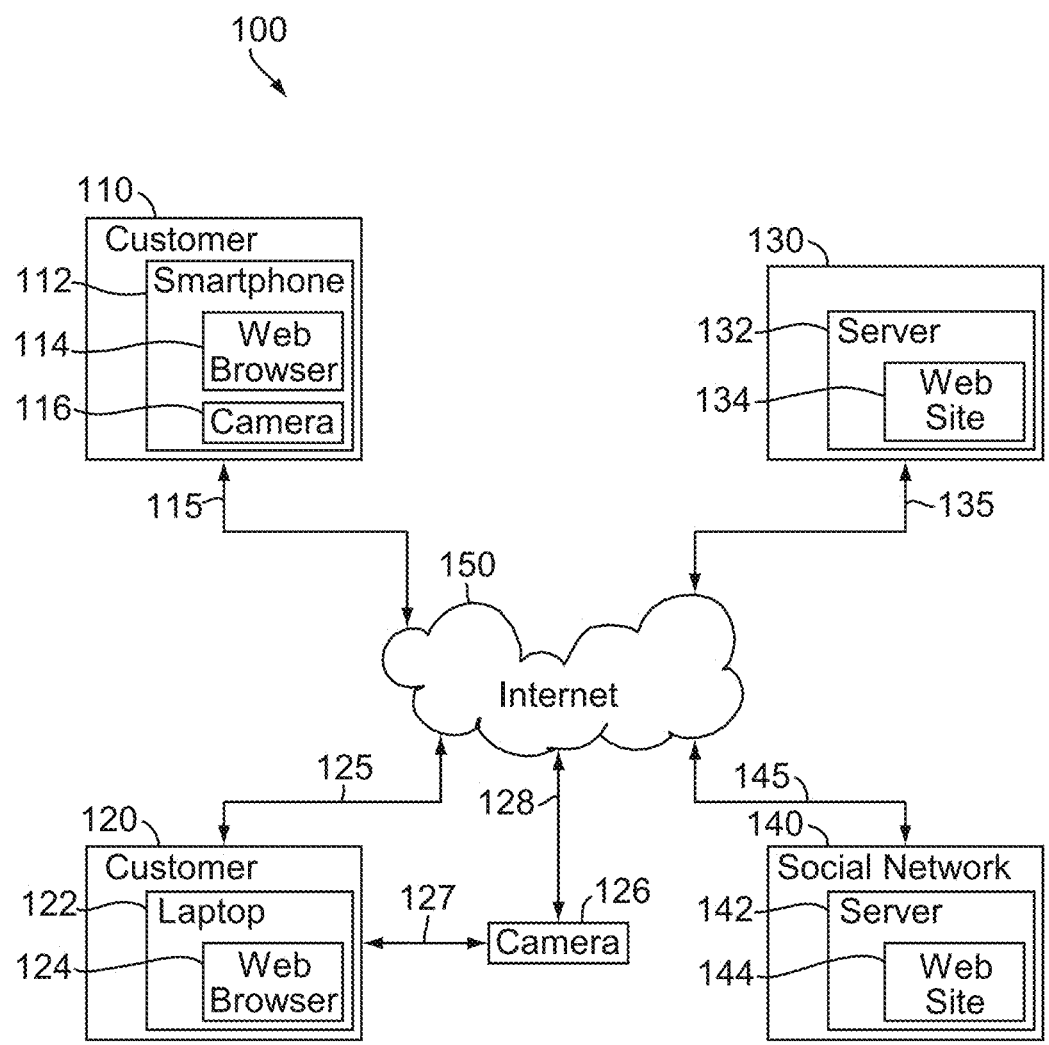
FIG. 1 is a block diagram of a networked system for matching social media data, in accordance with embodiments of the present disclosure.

As is set forth in greater detail below, the present disclosure is directed to systems and methods for identifying pertinent information regarding a member of a social network and harvesting data from the pertinent information for commercial purposes, such as the marketing of specific goods or services to the particular member. Specifically, one embodiment of the present disclosure describes systems and methods for analyzing and extracting data from information that has been posted to one or more Internet-based communications portals, including but not limited to social networks, blogs, photo galleries or photo sharing services, online marketplaces, online product rating web sites, or any other web sites at which users may post information. The information that may be analyzed by systems and methods of the present disclosure includes, but is not limited to, text, images or other media, that may be affiliated with a member or user of a communications portal, such as a social network. From such information, data regarding the member or user may be extracted and matched to one or more items that are available for purchase from an online marketplace, and such items may be marketed to the member.

Social networks (sometimes called "social networking sites" or "social networking services") typically enable users to provide information regarding their occupations, families, interests, activities, hobbies or any other aspect of their personal or professional lives. Users may provide information to a social network directly, by uploading or posting text, images, hyperlinks, audio or video to a social networking site. For example, members of the Facebook® or Google+™ social networks may post text, links, photographs, video, audio or other media to the networks, while members of the Twitter® social network may broadcast, or "tweet," information consisting of up to 140 characters of text and/or hyperlinks to the network. Users may also provide information to a social network implicitly, i.e., by expressing an interest in or endorsing a posting on the social network that has been made by another user. For example, a member of the social network Facebook® may approve or endorse information by clicking the "Like™" button on a posting by another member, or on a third-party site that features a "Like™" button synchronized with the member's social networking account, while a member of the social network Google+™ may provide similar signs of approval or endorsement by clicking the "+1™" button on a posting by another member, or on a third-party site that features such a "+1™" button. Similarly, a user of the social network Twitter® may approve or endorse information that has been posted or "tweeted" by a user whom the user is following, by "retweeting" the information to each of his or her followers or by copying and pasting the information into a "tweet" of his or her own, usually either from the Twitter® home page or from a third-party site.

The Internet-based information that may be analyzed by the systems and methods of the present disclosure may include concrete data or information, such as the text posted by a member of a social network; the contents of an image, video or other form of media posted by a member of a social network; or the contents of a website to which the user has linked, as well as metadata that may be affiliated with the data or information posted by the user (i.e., additional data, information, rules or other content pertaining thereto). For example, where a user posts a photograph to a social network, the data contained in or associated with the photograph, as well as any metadata associated with the photograph, may be utilized to generate product recommendations to the user. Such data and metadata may include any colors, textures or tones contained in the image; any persons, products, items, objects or conditions that may be depicted in and recognized from the photograph; or any tagged data or metadata that may be associated with the photograph, such as the date and time when the photograph was taken, or the location at which the photograph was taken. Similarly, where a user posts a text-based comment or a hyperlink to a website or file on a social network, the contents of the comment or the hyperlinked website or file may be associated with the user and further utilized to generate product recommendations. Finally, where a user expresses an interest or endorses information posted by another user, i.e., by clicking a Facebook® "Like™" button or a Google+™ "+1™" button, or by "tweeting" or "retweeting" information from a Twitter® account, the user's expression of interest or endorsement may also be associated with the user and further utilized to generate product recommendations.

Today, many social networks are directly integrated into one or more websites, as many social networks include "plug-ins" or other features that permit users to access websites through their social network accounts, or to access their social network accounts through other websites. In most situations, in order for a website to access a user's social network account, the social network simply must authenticate the website and the member, and the member must authorize the website to access the member's social network account on his or her behalf. For example, many websites, such as those maintained by news organizations, authorize social networks to track the stories or features viewed by readers, and permit readers to post links to the stores or features to their social networking accounts. Many other websites that permit viewers to provide comments regarding stories or features on the websites allow such viewers to post their comments on both the website and their social network accounts simultaneously. Also, many websites which allow owners of digital cameras to upload photograph files for printing or processing also allow such owners to post the uploaded photographs on their social networking accounts directly from the digital cameras, or from the photo processing websites.

The very nature of social networking demonstrates that social networks are valuable and reliable sources of personal information regarding their members. Most social networks enable members to post or to express an interest in or preference for information (e.g., text, images, hyperlinks, media, or other information indicative of a user's level of interest) that may be viewed by their fellow members (i.e., a select group of other members or the public at large), and to view similar information that may be posted or otherwise endorsed by other members. Because their postings or other activity may be viewed by others, users of social networks are likely to post information that they prefer, or information that is reflective of their personal interests. Likewise, for the same reasons, users are unlikely to post information that they do not prefer, or information that is not reflective of their personal interests. Furthermore, when accessing a social network, users are likely to review or provide comments on information posted to the social network by others that is consistent with their personal interests, and are unlikely to review or provide comments on information posted to the social network by others that is not consistent with their personal interests.

For example, where a user posts a photograph of a motorcycle rider who is wearing a red riding suit while riding on a rocky track to a social network, it may be assumed that the user likes motorcycles, the color red, and rough terrain. Accordingly, an online marketplace may strategically market items that relate to motorcycles (e.g., helmets, sunglasses, bandanas), items that are colored red, or items that have a rough texture to the user. Similarly, where a user expresses an interest in a photograph of a child playing in a Little League baseball game (i.e., by clicking a "Like™" or "+1™" button associated with the photograph, or by "retweeting" a link to the photograph), it may be inferred based on that expression of interest that the user likes children, baseball or events that occur in the spring (i.e., the time of year in which Little League baseball is played), and an online marketplace may selectively market children's gifts, sporting goods or springtime apparel to the user.

In addition to the contents of a photograph that is posted to a social network, other data or metadata that accompanies the photograph may be deduced from the photograph and also utilized by an online marketplace for commercial purposes. For example, where a user posts information to a social network at a particular date and time or from a particular location, the content or format of a user's post (e.g., the content of a website for which the user has posted a hyperlink, or the time, date or location of the user's post) may be analyzed to derive or interpret the user's interests. Additionally, many digital photographs or video files intrinsically include metadata, such as a date and time stamp indicating the date and time at which the photograph or video was taken, as well as a "geotag," i.e., a specified location or set of coordinates that identifies the place at which the photograph or video was taken. Moreover, where a user of a social network expresses an interest in a website, a particular issue or a posting by another user (such as by clicking a "Like™" or "+1™" button, or by "retweeting" information regarding the website, the issue or the posting), the content of that website, that particular issue or that posting may also be analyzed to derive the user's interests.

According to one embodiment of the present disclosure, an online marketplace may derive a color palette or texture palette from the contents of a digital image or photograph posted to a social network by one of its members, particularly the colors or textures of the persons, products, items, objects or conditions expressed therein. For example, an image or photograph may be divided or apportioned into sectors or clusters, and a representative color or texture may be identified for each of the sectors or clusters, such as by identifying one or more average pixels or textons within the sector, and by associating the identified pixels or textons with the sector. The sectors or clusters may be of equal size, or may be defined on any basis, including the relative portions of the image or photograph that includes each of the representative colors or textures, and a representative portion of the image or photograph within each sector or cluster may be defined as the representative color or texture for that sector or cluster. Similarly, a scene of a photograph may be classified on any of a number of levels ranging from the generic (e.g., outdoor, indoor) to the specific, such as a particular setting (e.g., mountainside, farm land, urban street), structure (e.g., office building, restaurant, theater) or room (e.g., classroom, kitchen, bedroom), based on the content expressed therein.

Once the color pall-et-palette or texture pall-et-palette has been derived, the online marketplace may identify selected items that may be of interest to the member on any basis (e.g., based on the member's preferences or past purchasing history), and may display such items embodying the colors of the color pall-et-palette or the textures of the texture-pallet palette. For example, where a user of a social network posts a photograph of a Christmas tree having a red base to a social network, it may be assumed that the user prefers items having green and red colors, particularly in a vertical orientation in which the green colors are positioned above the red colors. Where the user posts a photograph of the trees of a redwood forest to a social network, it may be assumed that the user prefers items having alternating zones of rough, dark textures (i.e., corresponding to the trunks of the trees) and smooth, light textures (i.e., corresponding to the gaps between the trees) in corresponding vertical alignments. Accordingly, the online marketplace may display the recommended items having green and red colors, or having alternating rough and smooth textures. Similarly, where a user of a social network posts a photograph of himself or herself to the social network, the user's skin tones, hair color or eye color, or other features may be identified and analyzed, and used to generate product recommendations that are consistent with the user's skin, hair, eyes or other features, such as particular articles of clothing, styles of make-up, brands or types of shampoo and the like.

According to another embodiment of the present disclosure, one or more personal tendencies of a user of a social network may be deduced or determined based on information that he or she posts to a social network, or based on information posted by others in which he or she expresses an interest. For example, where a user of a social network expressly states that he or she will be attending a particular event (e.g., a football game) or posts a picture that was taken at or during the particular event, it may be understood from the user's express statements or extracted from the user's photographs that the user is interested in not only the subject of the event itself (e.g., football) but also features, aspects or other information that is associated with or related to the event (e.g., the stadium or city where the football game is played, the players or teams participating in the football game, or football-related apparel that may be worn by other fans attending the game, or the players in the game itself). Moreover, it may also be determined that the user enjoys the same or similar events that may occur in the future. For example, where a user posts or otherwise indicates that he intends to attend a football game, it may be understood that the user not only likes football, but also is likely to attend football games in the future, particularly games that are played in the same stadium or city, or that involve the same contestants or teams.

Similarly, where a user of a social network posts a series of information or photographs to a social network, the information and photographs may be analyzed to determine patterns of activity of the user. For example, where the user posts photographs of himself or herself wearing a black tuxedo at a Las Vegas casino in January, wearing tan shorts and a blue collared shirt at a New York museum in July and wearing a green parka at a European ski resort in September, it may be inferred that the user enjoys traveling to warm climates or casinos on or around New Year's Eve, to large cities on or around Independence Day, or to foreign countries on or around Labor Day. Additionally, it may also be inferred that the user enjoys participating in several different activities, including gambling, skiing, and traveling to foreign countries; and wearing a variety of different types of clothing, including formalwear and casual wear, particularly in the colors black, tan, blue and green.

In such a manner, the systems and methods of the present disclosure may deduce information regarding a customer's tendencies, including what the customer likes to do, and where and when the user likes to do it, based on information that he or she posts to an Internet-based communications portal, such as a social network. Once this information has been identified, it may be utilized to identify recommended items for the customer at predetermined times of the year, and/or to display the recommended items, or other items, in the customer's preferred colors, and in accordance with the customer's preferences.

According to yet another embodiment of the present disclosure, where a user posts information (i.e., text, images or other media) that includes or otherwise makes reference to one or more items to a social network, the information regarding the items may be analyzed to identify the items shown or described therein, and to recommend additional products to the user. For example, where a user posts a photograph or a video showing the operation of an automobile, the photograph or one or more frames of the video may be analyzed to identify the automobile, including the particular make, model and year of the automobile, or items relating to the automobile (i.e., similar models of automobiles, accessories, tires, and the like), which may be recommended or otherwise marketed to the user.

Accordingly, by accessing a social network on behalf of one of its members, specific personal information regarding the member's preferences may be harvested from postings that have been made by or associated with the member. Such information may then be utilized by an online marketplace to recommend one or more items to the member, or to display recommended items or other items in colors or textures that the member prefers, or at times when the member may be likely to purchase them.

Referring to FIG. 1, one system 100 that may operate according to the systems and methods of the present disclosure is shown. Referring to FIG. 1, the system 100 includes customers 110, 120 (or members, users, consumers, shoppers or buyers), an electronic commerce or Internet-based marketplace 130 (or supplier, retailer, seller, reseller or distributor) and a social network 140, connected to one another across a network 150, such as the Internet.

The customers 110, 120 can be any entities or individuals that wish to download, purchase, rent, lease, borrow, or otherwise obtain items (which may include, but are not limited to, goods, products, services, information or media of any type or form) from the marketplace 130 using a client application, such as web browsers 114, 124, running on a smartphone 112 or a laptop computer 122. The customers 110, 120 may connect to or otherwise communicate with the marketplace 130 and/or the social network 140 by sending and receiving digital data over the network 150 using the smartphone 112 and/or the laptop computer 122, which may be connected to the network 150 as indicated by lines 115, 125. The web browsers 114, 124 provide one or more user interfaces for the customers 110, 120 to view and/or communicate with the marketplace website 134 and/or the social network website 144.

Additionally, customers or other users of the systems and methods of the present disclosure may utilize computing machines having one or more external peripheral devices, such as a camera, to send and receive information to or from the marketplace 130 or the social network 140. As is shown in FIG. 1, the customer 120 may also operate a camera 126, which may be connected to or otherwise associated with the customer 120 and/or the laptop computer 122, as indicated by line 127, or directly connected to the network 150, as indicated by line 128. The camera 126 and other cameras, peripherals or like devices may be connected to the laptop computer 122, the network 150 or other aspects of the present disclosure through any means, including wireless (e.g., wireless fidelity, or "WiFi," Bluetooth® or other known systems or protocols) or wired (e.g., Universal Serial Bus, or "USB") means known to those of ordinary skill in the pertinent art.

Furthermore, those of skill in the pertinent art will recognize that the customers 110, 120 may use a keyboard, keypad, mouse, stylus, touch screen, or other device (not shown) or method for interacting with the smartphone 112, the web browser 114 and/or the camera 116; the laptop computer 122 and/or the web browser 124; the camera 126; the marketplace 130, the server 132 and/or the website 134; or the social network 140, the server 142 and/or the website 144, or to "select" an item, link, node, hub or any other aspect of the present disclosure.

The marketplace 130 itself may be an entity that sells or otherwise makes items available for download, purchase, rent, lease or borrowing by customers, such as customers 110, 120, from a marketplace website 134 or other processing system. The marketplace website 134 or other processing system may be implemented using one or more physical computer servers 132, which are connected to or otherwise communicate with the network 150, as indicated by line 135, by sending and receiving of digital data. In addition, the items made available at the marketplace 130 or ordered by the customers 110, 120 may be made by or obtained from one or more third party vendors (or merchants or manufacturers), and the marketplace 130 itself may be a merchant or vendor.

The social network 140 may be a platform or hub at which a variety of members that are connected or otherwise linked by one or more distinct relationships may communicate with another through the exchange of information with the platform or hub over the network 150. The social network 140 may be accessed by any number of users, such as customers 110, 120, who may visit a social networking website 144 or other processing system that may be implemented using one or more physical computer servers 142. The social network web site 144 or other processing system may be connected to or otherwise communicate with the network 150, as indicated by line 145, by sending and receiving of digital data. The social network 140 may present data or information on one or more standard or customizable interfaces on behalf of each of its members, which may be viewed by select other members (e.g., "friends," "contacts" or "connections") of the social network or the general public, and each of the interfaces may feature text, images or other media, or hyperlinks to external content.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Process steps described herein as being performed by a "customer," a "marketplace," or a "social network" may be automated steps performed by their respective computer systems, or implemented within software modules (or computer programs) executed by one or more general purpose computers. Moreover, process steps described as being performed by a "customer," a "marketplace," or a "social network" may be typically performed by a human operator via the computers 112, 122, the camera 126 or the servers 132, 142 but could, alternatively, be performed by an automated agent.

The customers 110, 120, the marketplace 130 and the social network 140 may use any web-enabled or Internet applications or features, such as the web browsers 114, 124 or the websites 134, 144, or any other client-server applications or features including electronic mail (or E-mail), or other messaging techniques, to connect to the Internet 150 or to communicate with one another, such as short or multimedia messaging service (SMS or MMS) text messages. In addition, the computers 112, 122, the camera 126 and the servers 132, 142 may include any of a number of computing devices that are capable of communicating over the network, including but not limited to set-top boxes, personal digital assistants, mobile phones including "smartphones," digital media players, web pads, tablet computers, laptop computers, desktop computers, electronic book readers, and the like. The protocols and components for providing communication between the computers 112, 122, the camera 126 and the servers 132, 142 are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the computers 112, 122, the camera 126 and/or the servers 132, 142, and having sequences of instructions which, when executed by a processor (such as a central processing unit, or CPU), cause the processor to perform all or a portion of the functions and/or methods described herein. Such computer executable instructions, programs, software and the like may be loaded into the memory of the computers 112, 122, the camera 126 and/or the servers 132, 142 using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

A wide array of data or attributes may be extracted from a digital photograph, such as those which may be posted to a social network or other website. For example, many digital image files (such as those files created according to the Joint Photographic Experts Group standard, or ".JPEG" or ".JPG" files) contain hidden, intrinsic information such as the exact date and time that the photograph was captured and/or modified; the manufacturer, model, and unique serial number of the digital camera that captured the image; the camera settings when the image was captured; the location at which the image was captured; and a thumbnail of the image. Additionally, with regards to objects or items that may be represented in a photograph, such as clothing, one or more shapes, colors and/or color schemas, sizes, styles, fits, textures and/or brands (i.e., trademarks) may be directly identified therein. Furthermore, the presence of faces and other features within a digital photograph may also be extracted from the image file through standard recognition algorithms and procedures.

Data, attributes and/or other information may be extracted from image files of any type or format, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, or any other image files, may be analyzed in accordance with the present disclosure. Similarly, such data, attributes and information may also be extracted from still images or individual frames captured from any type or format of video file, including but not limited to Audio Video Interleave (or ".AVI"), QuickTime (or ".MOV"), Moving Picture Experts Group (or ".MPG," ".MPEG" or ".MP4") or Windows Media Video (or ".WMV") files, or any other video files, in accordance with the present disclosure.

Those of ordinary skill in the art recognize that information and data regarding the colors shown in a digital photograph may be extracted from the photograph in any number of ways, and that the color of a single pixel or a group of pixels may be determined and quantified according to one or more standards. According to the RGB color model, the portions of red, green and blue contained in one or more pixels is rated on a scale from 0 to 255; thus, over 16.7 million distinct colors may be expressed according to the RGB color model. For example, the colors white and black are expressed in RGB codes as 255, 255, 255 and 0, 0, 0, respectively, while the color National Flag Blue is expressed as 0, 38, 100. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. Like the RGB color model, over 16.7 million distinct colors may be expressed in the hexadecimal model. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure.

Similarly, those of ordinary skill in the art further understand that an image texture expressed within a digital photograph, which may be defined or understood to be a function of the variation of pixel-level intensities in the digital photograph, may be quantitatively determined by recognizing regions or sectors of an image based on their respective texture properties, comparing numerical measures of the relative intensities of the pixels or textons in a particular region or sector to one another, or on any other basis, and defining an array or map associating each textured region or sector with a surface or class of surfaces. Textures may be defined based on one or more repetitive patterns in an image, i.e., if the properties of the image are constant, varying slowly, or substantially periodic in nature, and may be recognized using one or more algorithms or machine-learning tools that may extract texture features or boundaries of regions or sectors of an image. Any means or model for quantifying a texture within an image or photograph may be utilized in accordance with the present disclosure.

Moreover, those of ordinary skill in the art also understand that objects may be identified within images or photographs using one or more algorithms or machine-learning tools. For example, an object may be recognized within an image or photograph by identifying the edges, contours or outlines of the object, or fragments thereof, such as by using active contour modeling, or "snakes," to delineate an outline of the object, and matching the identified edges, contours, outlines or fragments against a database of edges, contours or outlines of known objects. Any means or model for identifying objects within an image or photograph may be utilized in accordance with the present disclosure.

The systems and methods of the present disclosure may provide further advantages in commercial applications, such as those that may be operated or maintained by an online marketplace, by providing access to additional information regarding a customer's preferences and interests to complement information that is already known about the customer, such as his or her purchasing history. For example, where it is known that a customer prefers a particular type or style of item, the customer's preferences for color or texture may be deduced or derived based on the information posted on a social network, and an item of the customer's preferred type or style may be shown having colors or textures preferred by the customer. Alternatively, where an online marketplace does not have any information regarding a first-time customer's preferences or interests, such information may be derived from postings made or endorsed by the first-time customer on a social network, including any photographs or other images included, referenced or linked there.

For the purposes of illustration, some of the systems and methods disclosed herein may be referenced primarily in the context of analyzing photographs posted by users of a social network, such as the customers 110, 120 and the social network 140 shown in FIG. 1; extracting data from the photographs; and utilizing the extracted data to market one or more items to the users, such as by the online marketplace 130 shown in FIG. 1. As will be recognized by those of skill in the art, however, the systems and methods disclosed herein may also be used in many other situations, and are not limited to the preferred embodiments described herein.

Figure 2:
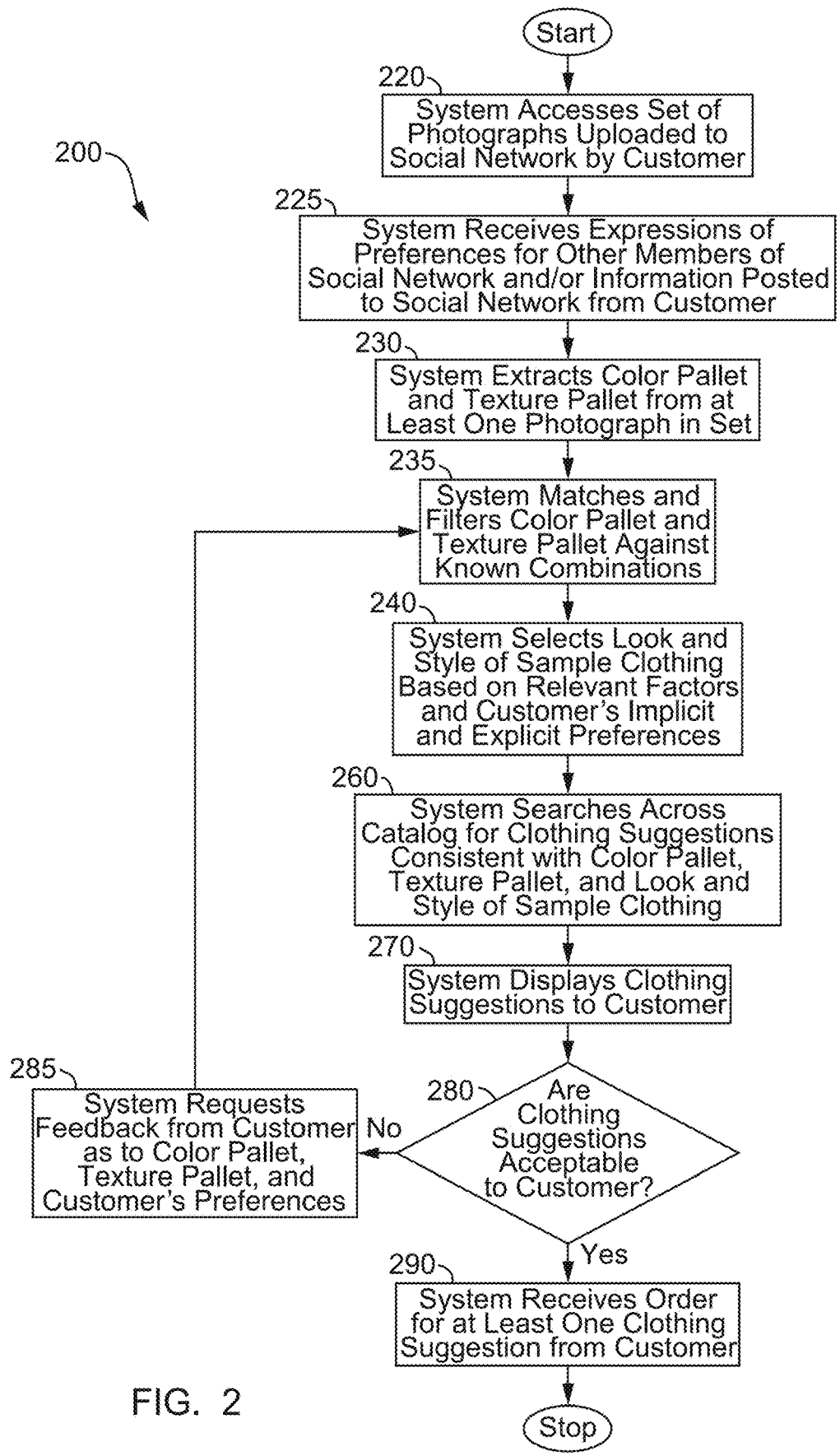
FIG. 2 is a flow chart of a process for matching social media data, in accordance with embodiments of the present disclosure.

Referring to FIG. 2, a flow chart 200 representing one embodiment of a process for matching social media data is shown. At step 205, a system accesses a set of photographs that have been uploaded to a social network by a customer. For example, where an online marketplace has been authorized to access one of its customers' Facebook® pages, the online marketplace may access any galleries, albums or other sets of photographs that have been uploaded by the customer, or have been identified (i.e., "tagged") by other members of the social network as including or relating to the customer. At step 225, the system receives expressions of preferences for other members of the social network and/or information posted to the social network from the customer. For example, the customer may "like" a Facebook® posting or page including text, images or other media, or "tweet" or "retweet" a comment or link from his or her Twitter® account.

At step 230, the system extracts a color palette and texture palette from at least one of the photographs in the set, and at step 235, the system matches and filters the color palette and the texture palette extracted from the photographs against known combinations of colors and textures of items that may be available at the online marketplace. For example, where the photographs in the set indicate a preference for certain hues or shades, a color palette or texture palette including one or more of such hues or shades may be extracted from the photographs, and matched against available clothing or other items that are available for purchase at the online marketplace.

At step 240, the system selects a look and style of sample clothing based on relevant factors and the customer's implicit and explicit preferences. For example, a customer may enter one or more keywords into a search engine to search for a particular type of clothing, such as "jogging suit" or "golf shorts," and the sample clothing may correspond to the keywords entered by the customer. Additionally, where a customer is known to prefer a particular look and style of clothing based on his or her past purchases or on any other basis, that look and style of clothing may be designated as the sample clothing. Alternatively, where it is determined that a customer shares one or more interests in common with another customer who prefers a particular look or style of clothing, that look and style may be imputed to the customer. Finally, a particular look or style of clothing may be selected based on the time of year when the customer accesses the marketplace (e.g., selecting Halloween costumes in September or October). Moreover, the sample clothing may be selected based on a price point associated with the customer's past purchases. At step 260, the system searches a catalog for clothing suggestions that are consistent with both the color palette and the texture palette extracted from the set of pictures, and the look and style of the sample clothing selected at step 240.

At step 270, the system displays the clothing suggestions to the customer, and at step 280, the system determines whether the clothing suggestions are acceptable to the customer. For example, the customer may be presented with an express request such as, "do you like this suggestion?" and the customer's answer may definitively determine whether the suggestions are appropriate. Alternatively, if the customer requests another item or navigates away from the suggestion, it may be implicitly determined that the suggestion is not acceptable. If the clothing suggestions are not acceptable, then the system requests feedback from the customer as to the accuracy of the color palette, the texture palette and/or the customer's specific preferences at step 285, and returns to step 235. If the clothing suggestions are acceptable to the customer, then the system receives an order for at least one of the clothing suggestions from the customer at step 290, and the process ends.

Accordingly, the systems and methods of the present disclosure may be utilized when recommending items to a customer who is visiting an online marketplace. By accessing a social network on behalf of the customer, and by analyzing information and/or media posted by or associated with the customer, the online marketplace may derive a color palette and a texture palette, and present recommended items in accordance with the color palette and/or the texture palette to the customer. In such a manner, the customer may be more likely to purchase the recommended items, which are displayed having colors or textures that the customer is believed to prefer, based on the information and/or media posted on the social network.

Color palettes and/or texture palettes may be defined based on any basis, using one or more photographs. According to one embodiment of the present disclosure, a photograph may be divided into sectors consisting of a certain number of pixels, and a color or portion of the photograph from each of the sectors may be selected and designated as the representative color for that sector, such that the color palette is defined as including each of the representative colors of the sectors. One way to determine the representative color of a sector is to determine the colors of each of the pixels according to the RGB model, and to average the respective portions of red, green and blue of each of the pixels in order to arrive at a representative RGB color code for the sector as a whole. For example, where a sector includes ten safety orange pixels having an RGB code of 232, 118, 0, ten royal blue pixels having an RGB code of 65, 105, 225, and five slate grey pixels having an RGB code of 119, 136, 153, the average RGB code of the sector is approximately 143, 116, 121, which is similar to the color squirrel, a light brown-grey blend. Any other means for defining a color palette or a texture palette, or the colors or textures arranged therein, may be utilized in accordance with the present disclosure.

Figure 3A:
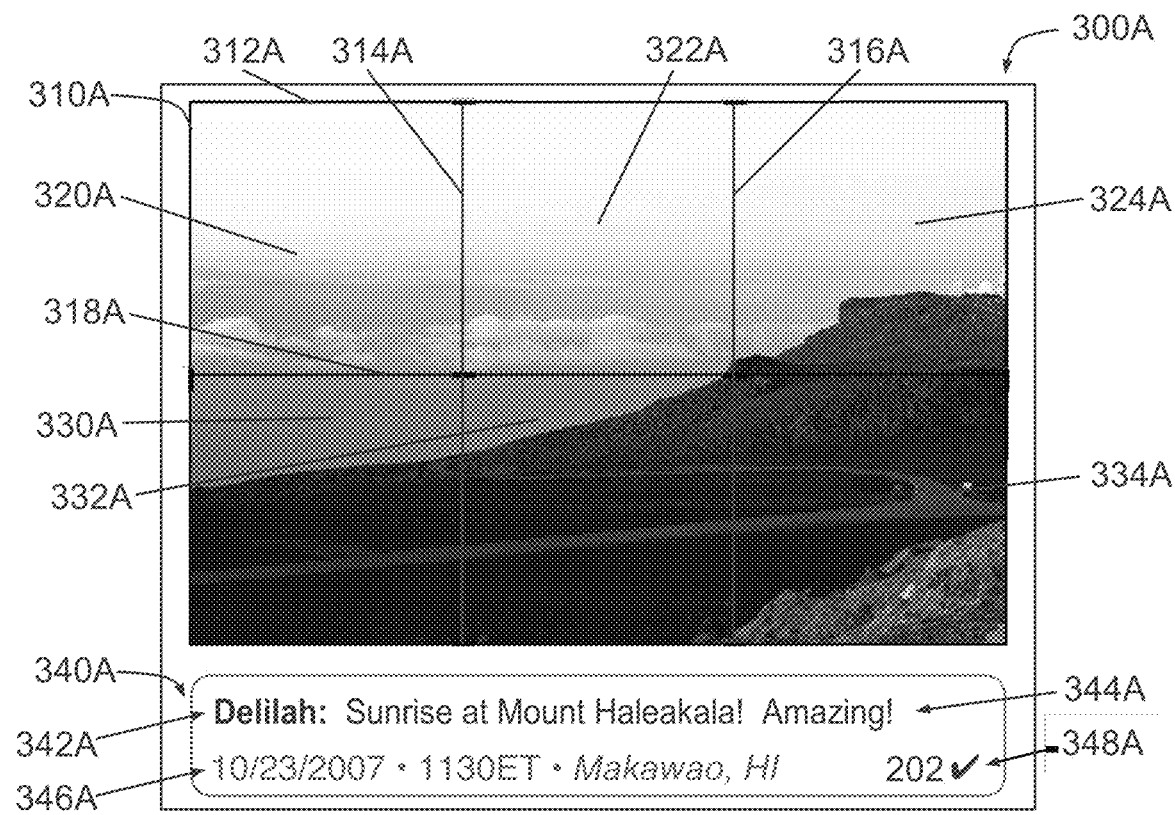
FIGS. 3A and 3B are exemplary color pallets palettes that may be derived from social media data, in accordance with embodiments of the present disclosure.
Figure 3A:
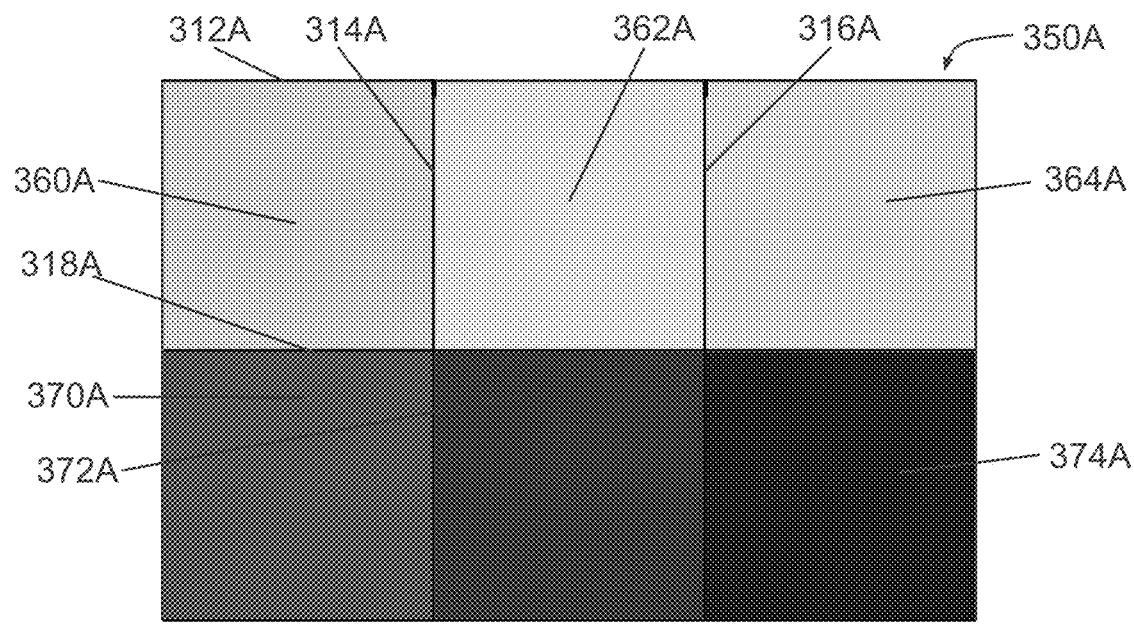
Figure 3B:
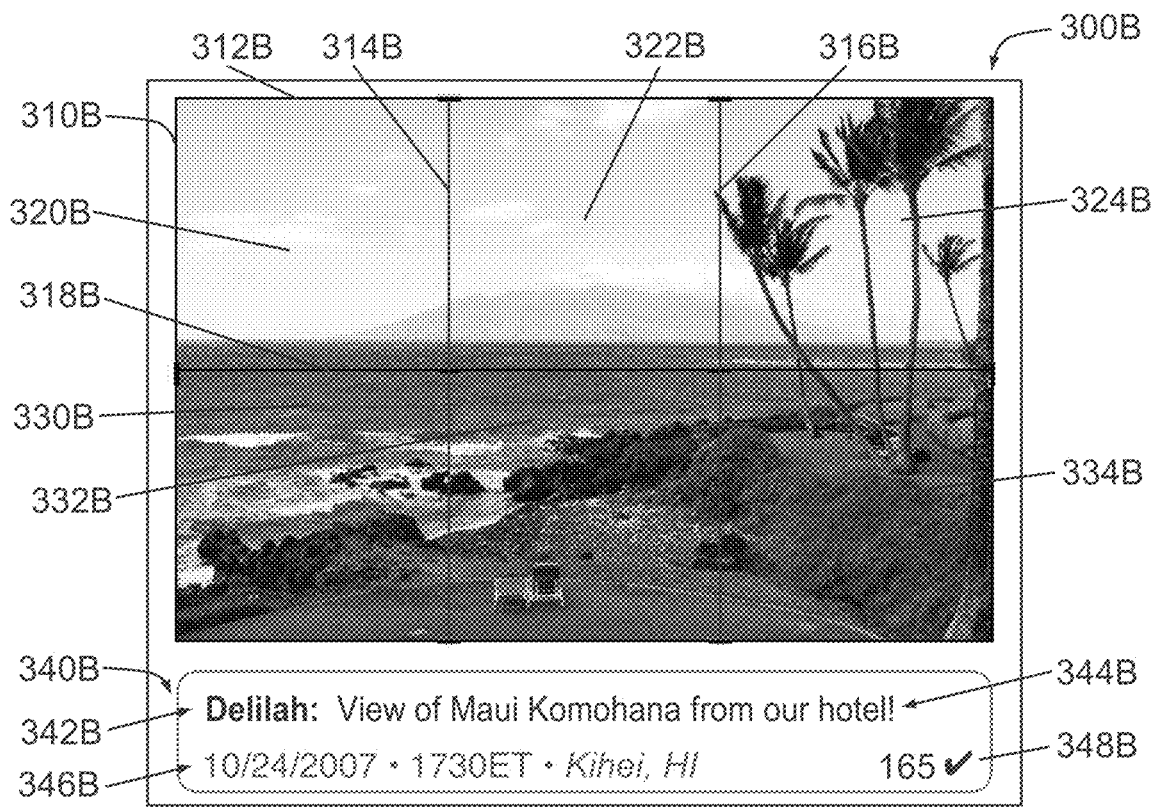
Figure 3B:
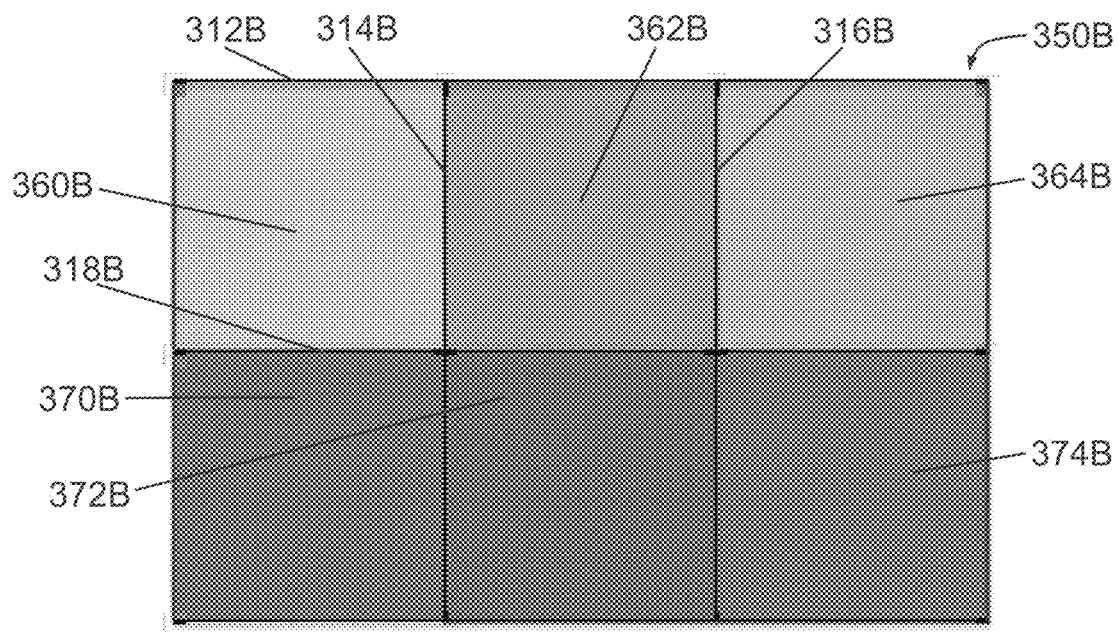

Referring to FIGS. 3A and 3B, two exemplary color palettes that may be derived from social media data are shown. Referring to FIG. 3A, a social network posting 300A and color palette 350A are shown. The social network posting 300A includes a digital photograph 310A and a comment section 340A. A frame 312A having gridlines 314A, 316A, 318A superimposed on the digital photograph 310A divides the digital photograph 310A into sectors 320A, 322A, 334A, 330A, 332A, 334A. The comment section 340A includes an identity 342A of the network member who posted the photograph (viz., "Delilah") and a comment 344A associated with the photograph (viz., "Sunrise at Mount Haleakala! Amazing!"), as well as a stamp 346A identifying the date, time and location of the photograph (i.e., Oct. 23, 2007, 11:30 Eastern Time, at Makawao, Hawaii), and a number 348A of other members who have expressed their interested in or approval of the photograph 310A. The color palette 350A includes representative colors 360A, 362A, 364A, 370A, 372A, 374A separated by the grid 310A. Similarly, FIG. 3B also shows a social network posting 300B including a digital photograph 310B and a comment section 340B, as well as a color palette 350B.

Therefore, as is discussed above, the systems and methods of the present disclosure may be utilized to determine a customer's color preferences based on one or more photographs that the customer has posted to a social network, or that have been posted to a social network and otherwise associated with (i.e., "tagged") the customer. From the one or more photographs, a color palette, such as the color palette 350A shown in FIG. 3A or the color palette 350B shown in FIG. 3B and/or a texture palette may be generated, and product offerings that are consistent with not only the colors of the color palette but also their orientation within the color palette may be displayed to the customer. For example, referring to the color palette 350A shown in FIG. 3A, an online marketplace may recommend combinations of clothing consisting of light blue, purple or pink-colored tops (e.g., shirts) or related accessories (e.g., ties) consistent with the colors 360A, 362A and 364A, and dark brown or maroon-colored bottoms (e.g., pants, shorts or skirts) or related accessories (e.g., shoes) consistent with the colors 370A, 372A and 374A, such that the combinations of clothing are consistent with the orientation of the colors 360A, 362A, 364A, 370A, 372A, 374A within the color palette 350A. Similarly, referring to the color palette 350B shown in FIG. 3B, where a customer searches for a particular home improvement item or appliance (e.g., a new television or furniture item), an online marketplace may display pictures of the item or appliance in settings having interior decorations including light blue or light green paint colors or window dressings that are consistent with the colors 360B, 362B, 364B, and dark blue or dark green carpeting or fixtures consistent with the colors 370B, 372B, 374B, such that the combinations of clothing are consistent with the orientation of the colors 360B, 362B, 364B, 370B, 372B, 374B within the color palette 350B.

Color palettes and/or texture palettes may be derived from data posted to an Internet-based communications portal, such as a social network, on any basis and by any means. For example, colors or textures may be identified from particular areas of a photograph and arranged into palettes based on the respective orientation or arrangement of the areas within the photograph, such as is shown in FIGS. 3A and 3B. Additionally, the color palette and/or texture palette may preferentially favor or disfavor colors or textures based on a measure of their respective predominance within the photograph, i.e., in accordance with the proportional and geographic distribution within the photograph. For example, where a set of photographs indicates a user's strong preference for various shades of blue, and mild interest in some other, secondary colors such as red, a color pellet-palette for the user may include several shades of blues as well as some shades of red, and may be utilized to identify predominantly blue colored-items having red attributes or features.

Figure 4:
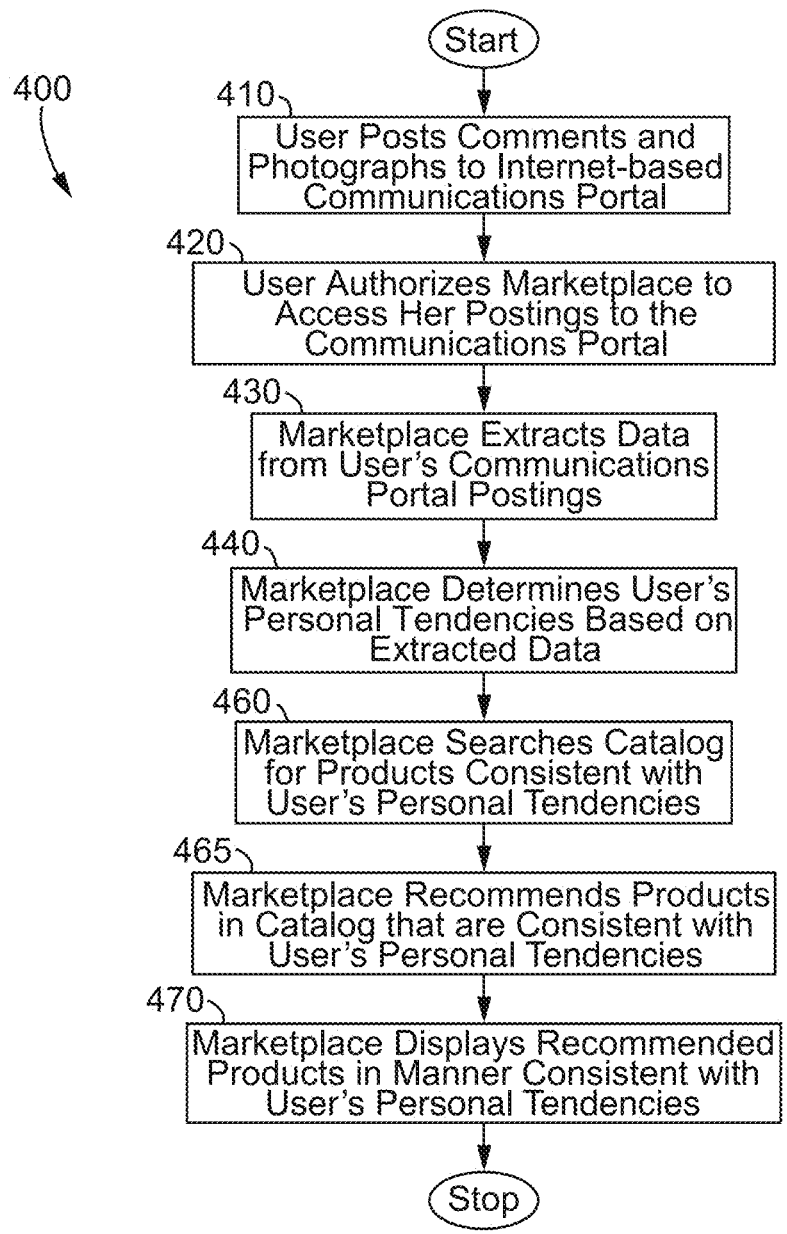
FIG. 4 is a flow chart of a process for matching social media data, in accordance with embodiments of the present disclosure.

The systems and methods of the present disclosure may also be utilized to derive a user's personal tendencies (i.e., what the user prefers to do, and when, where and how the user prefers to do it) from his or her social network postings, which may include photographs. Once the customer's personal tendencies have been derived, information regarding the tendencies may be used to recommend one or more items or to target particular marketing efforts to the user. Referring to FIG. 4, a flow chart 400 representing one embodiment of a process for matching social media data is shown. Except where otherwise noted, the corresponding steps of the flow chart 400 shown in FIG. 4 which begin with the number "4" are similar to the corresponding steps of the flow chart 200 shown in FIG. 2 which begin with the number "2."

At step 410, a user posts comments and photographs to an Internet-based communications portal, such as a social network, a blog, a photo gallery or photo sharing service, online marketplace, news web site, or any other web site at which information may be posted by one or more users. For example, a user may post the photographs 310A, 310B and/or the comments 344A, 344B shown in FIG. 3A or FIG. 3B to one or more social network pages or accounts. At step 420, the user may authorize a marketplace to access his or her postings or other information at the communications portal. For example, the user may log into his or her social network account prior to accessing the marketplace, and remain logged into the social network as he or she accesses the marketplace, or the marketplace may request permission to access the user's social network account externally. At step 430, the marketplace extracts data from the user's postings to the communications portal. For example, the marketplace may identify the user's postings and/or photographs that have been uploaded to the social network by the user, and/or photographs that have been associated with the user by other users. The marketplace may also identify the postings of other users for which the user has expressed a preference (i.e., the postings for which the user has clicked a "Like™" button or a "+1™" button, or like features, on a social network).

At step 440, the marketplace may determine the user's personal tendencies based on the extracted data. For example, the marketplace may identify the places frequented by the user, the times and dates when the user frequents them, from photographs that have been posted by or associated with the user, such as are expressed in the stamps 346A, 346B shown in FIGS. 3A and 3B. The marketplace may also derive a color palette and/or texture palette indicative of the user's preferences from photographs that have been posted by or associated with the user, such as the color palettes 350A, 350B generated from photographs 310A, 310B shown in FIGS. 3A and 3B.

At step 460, the marketplace searches a catalog for products consistent with the user's personal tendencies, and at step 465, the marketplace recommends such products to the user. For example, where it is determined that a user frequents mountains, such as is suggested in the photograph 310A shown in FIG. 3A, an online marketplace may recommend hiking boots and/or cold weather gear to the user. Where it is determined that a user frequents beaches, such as is suggested in the photograph 310B shown in FIG. 3B, the marketplace may recommend swimsuits, towels and/or other beach gear to the user. Where it is determined that a user prefers to travel to certain destinations, such as the destinations indicated in the stamps 346A, 346B shown in FIGS. 3A and 3B, travel packages or discounts on airfare to those destinations, or accommodations at those destinations, may be offered to the user.

At step 470, the marketplace displays the recommended products in accordance with the user's personal tendencies. For example, where it is determined that a user is interested in recreational vehicles and regularly attends football games, an electronic mail message marketing recreational vehicles to the user and including an image of one of the vehicles at a tailgate party may be delivered to the user, perhaps in the colors worn by the user's favorite football team. Where it is determined that a user is interested in canoes and is an avid hunter, an image of a canoe being paddled by duck hunters on a lake may be displayed to the user on an open web page, in a "pop-up" window over an open web page, or in any other manner.

Accordingly, based on information that have been posted at a communications portal by or on behalf of a customer, including but not limited to photographs or other media, an online marketplace can derive the customer's personal tendencies, and offer items (e.g., goods or services) to the customer that are consistent with the customer's personal tendencies, thereby enhancing the customer's shopping experience at the online marketplace.

Figure 5A:
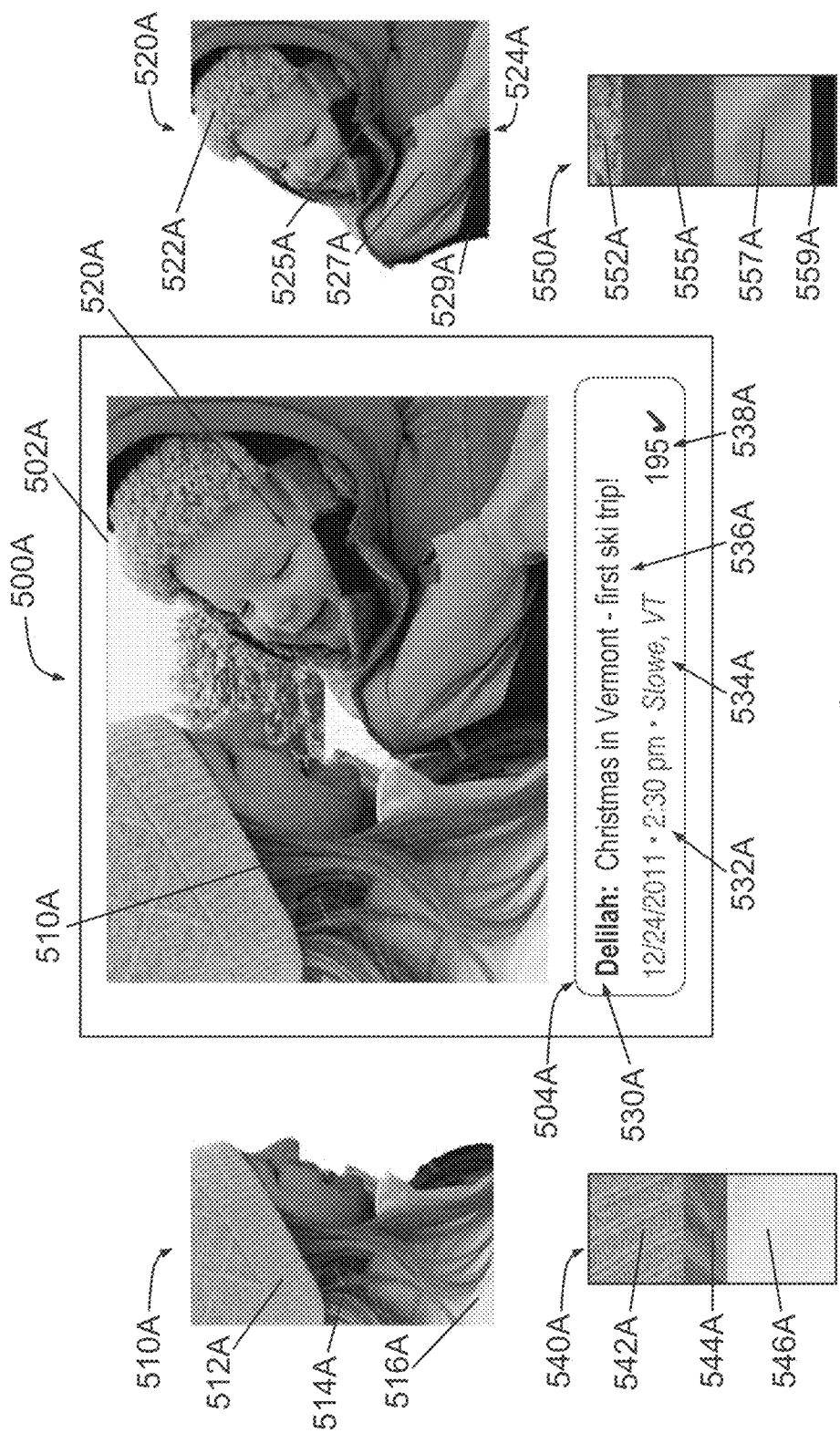

An analysis of information and/or media that has been posted at a social network and affiliated or otherwise associated with a customer can yield a trove of information regarding a customer's personal tendencies. Referring to FIG. 5A, a social network posting 500A, and two color and texture palettes 540A, 550A are shown. The social network posting 500A includes a photograph 502A and comment section 504A. The photograph 502A shows two individuals 510A, 520A. The comment section 504A includes an identity 530A of the person who made the posting 500A, a stamp 532A indicating the date and time at which the posting 500A was made, a stamp 534A indicating the location from which the posting was made, a comment 536A associated with the posting 500A, and a number 538A of other members who have expressed their interest in or approval of the posting 500A, the photograph 502A and/or the comment 536A (i.e., by selecting a "Like™" button or "+1™" button associated with the posting 500A, or by "retweeting" the posting 500A).

As is also shown in FIG. 5A, the outlines or silhouettes of the individuals 510A, 520A may be extracted from the photograph 502A and analyzed in order to identify data, attributes and/or other information regarding the personal tendencies of the person 530A who made the posting 500A. For example, the individual 510A is determined to be wearing a light blue wool hat 512A and a white ski jacket 516A, and having blonde hair 514A. From this information, color and texture palette 540A may be generated, including a first aspect 542A having light blue-colored and soft, woven features, corresponding to the color and texture of the hat 512A worn by the individual 510A; a second aspect 544A having fine, golden features, corresponding to the color and texture of the hair 514A of the individual 510A; and a third aspect 546A having mostly white colors and synthetic non-woven features corresponding to the color and texture of the jacket 516A worn by the individual 510A. Each of the aspects 542A, 544A, 546A is arranged in the vertical orientation in which the hat 512A, hair 514A and jacket 516A appear on the individual 510A in the photograph 502A. Furthermore, the relative sizes of the first aspect 542A, the second aspect 544A and the third aspect 546A within the color and texture palette 540A correspond to the relative portions of the corresponding colors and textures within the photograph 502A.

Similarly, as is also shown in FIG. 5A, the individual 520A is determined to be wearing a dark and woolen hat 522A and a three-color ski jacket 524A. From this information, color and texture palette 550A may be generated, including a first aspect 552A having light brown colors and rough, woolen features, corresponding to the color and texture of the hat 522A worn by the individual 520A; and a second aspect 555A, a third aspect 557A and a fourth aspect 559A including royal blue, grey and dark blue synthetic non-woven features, respectively, corresponding to the colors and textures of the jacket 524A worn by the individual 510A. Each of the aspects 552A, 555A, 557A, 559A is arranged in the vertical orientation in which the hat 522A and the jacket 524A appear on the individual 520A in the photograph 502A, and the relative sizes of the first aspect 552A, the second aspect 555A, the third aspect 557A and the fourth aspect 559A within the color and texture palette 550A correspond to the relative portions of the corresponding colors and textures within the photograph 502A.

In addition to the color and texture palettes 540A, 550A, a variety of other attributes may be extracted from the posting 500A. For example, based on the information shown in the comment section 504A of the posting 500A, it may be determined that the person 530A prefers to travel to the location 534A at the date and time 532A, and to perform some or all of the activities mentioned in the posting 500A (viz., skiing). Moreover, it may also be determined that the person 530A prefers to purchase clothing or other items for a woman in her late twenties (i.e., individual 510A) or a child (i.e., individual 520A). Such data or information, and any other data or information that may be extracted from the posting 500A, the photograph 502A or the comment section 504A, may then be utilized in recommending one or more items or targeting particular marketing efforts to the person 530A.

Figure 5C:
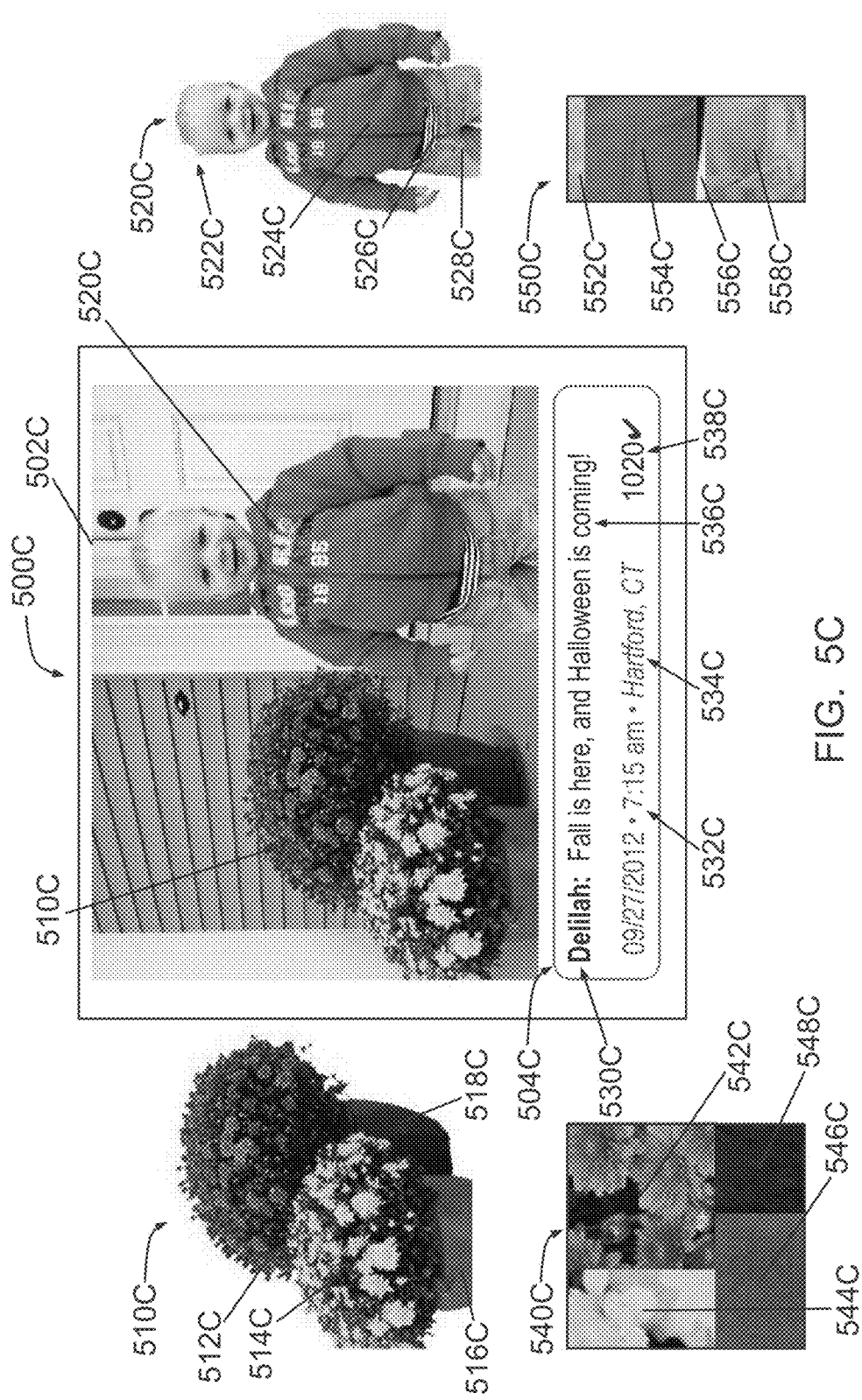

Similarly, referring to FIGS. 5B and 5C, two other social network postings 500B, 500C are shown. Referring to FIG. 5B, the posting 500B includes a photograph 502B and a comment section 504B. The photograph 502B shows two individuals 510B, 520B. The comment section 504B includes an identity 530B of the person who made the posting 500B, a stamp 532B indicating the date and time at which the posting 500B was made, a stamp 534B indicating the location from which the posting was made, a comment 536B associated with the posting 500B, and a number 538B of other members who have expressed their interest in or approval of the posting 500B, the photograph 502B and/or the comment 536B.

Additionally, the outlines or silhouettes of the individuals 510B, 520B may be extracted from the photograph 502B and analyzed in order to identify data, attributes and/or other information regarding the personal tendencies of the person 530B who made the posting 500B. As is shown in FIG. 5B, the individual 510B is determined to be wearing a straw hat 512B, a synthetic sun shirt 514B and blue athletic shorts 516B, and from this information, color and texture palette 540B may be generated. The color and texture palette 540B includes a first aspect 542B having yellowish tan colors and rough, ribbed features, corresponding to the color and texture of the hat 512B worn by the individual 510B; a second aspect 544A having teal, synthetic mesh-like features, corresponding to the color and texture of the shirt 514A worn by the individual 510B; and a third aspect 546B having blue and white stripes, and corresponding to the color and texture of the jacket 516B worn by the individual 510B. Each of the aspects 542B, 544B, 546B in the color palette 540B is arranged in the vertical orientation in which the hat 512B, shirt 514B and jacket 516B appear on the individual 510B in the photograph 502B, and the relative sizes of the first aspect 542B, the second aspect 544B and the third aspect 546B within the color and texture palette 540B correspond to the relative portions of the corresponding colors and textures within the photograph 502B.

Likewise, the individual 520B is determined to be wearing a black fishing hat 522B depicting animated sea creatures, a bright red sun shirt 524B, a dark red bathing suit 526B and tricolor water shoes 528B. From this information, color and texture palette 550B may be generated, including a first aspect 552B having mostly black colors, corresponding to the color and texture of the hat 522B worn by the individual 520B; a second aspect 554B having bright red colors and synthetic features, corresponding to the colors and textures of the sun shirt 554B worn by the individual 520B; a third aspect 556B having dark red colors and stitched seams, corresponding to the bathing suit 526B worn by the individual 520B; and a fourth aspect 558B having blue, green and grey colors and meshed features, corresponding to the colors and textures of the water shoes 528B worn by the individual 510B. Each of the aspects 552B, 554B, 556B, 558B in the color palette 550B is arranged in the vertical orientation in which the hat 522B, the shirt 524B, the bathing suit 526B and the water shoes 528B appear on the individual 520B in the photograph 502B, and the relative sizes of the first aspect 552B, the second aspect 554B, the third aspect 556B and the fourth aspect 558B within the color and texture palette 550B correspond to the relative portions of the corresponding colors and textures within the photograph 502B.

Additionally, as with the posting 500A shown in FIG. 5A, other information may be extracted from the posting 500B shown in FIG. 5B, including that the person 530B prefers to travel to the location 534B at the date and time 532B, and to perform some or all of the activities mentioned in the posting 500B (i.e., traveling to beaches and swimming). Moreover, and also as with the photograph 502A shown in FIG. 5A, it may be determined that the person 530B prefers to purchase clothing or other items for a woman in her late twenties or a child, based on the individuals 510B, 520B identified in the photograph 502B. Such data or information, and any other data or information that may be extracted from the posting 500B, the photograph 502B or the comment section 504B, may then be utilized in recommending one or more items or targeting particular marketing efforts to the person 530B.

Referring to FIG. 5C, the posting 500C includes a photograph 502C and a comment section 504C. The photograph 502C shows a decorative floral arrangement 510C and an individual 520C. The comment section 504C includes an identity 530C of the person who made the posting 500C, a stamp 532C indicating the date and time at which the posting 500C was made, a stamp 534C indicating the location from which the posting was made, a comment 536C associated with the posting 500C, and a number 538C of other members who have expressed their interest in or approval of the posting 500C, the photograph 502C and/or the comment 536C.

The outlines or silhouettes of the floral arrangement 510C and the individual 520C shown in FIG. 5C may be extracted from the photograph 502C and analyzed in order to identify data, attributes and/or other information regarding the personal tendencies of the person 530C who made the posting 500C. As is shown in FIG. 5C, the floral arrangement 510C includes a pair of chrysanthemums 512C, 514C in green-colored pots 516C, 518C, and the individual 520C has blond hair 522C and is wearing a sweatshirt 524C, an undershirt 526C and pants 528C. From this information, color and texture palettes 540C, 550C may be generated. The color and texture palette 540C includes a first aspect 542C having bright orange flowers and dark green stems and leaves, corresponding to the colors and textures of the *chrysanthemum* 512C, and a second aspect 544C having bright yellow flowers and dark green stems and leaves, corresponding to the colors and textures of the *chrysanthemum* 514C. The color and texture palette 540C further includes a third aspect 546C and a fourth aspect 548C having light green-colored and dark green-colored smooth textures, respectively, corresponding to the colors and textures of the pots 516C, 518C. The color and texture palette 550C includes a first aspect 552C having fine, bright yellow features, corresponding to the hair 522C of the individual 520C; a second aspect 554C having orange-colored rough, stitched features, corresponding to the sweatshirt 524C worn by the individual 520C; a third aspect 556C having blue and white finely woven features, corresponding to the cotton undershirt 526C worn by the individual 520C, and a fourth aspect 558C having light brown, twill textures, corresponding to the pants 528C worn by the individual 520C. Each of the aspects 542C, 544C, 546C, 548C in the color palette 540C is arranged in the spatial arrangement in which the chrysanthemums 512C, 514C and the pots 516C, 518C appear in the floral arrangement 510C in the photograph 502C, and each of the aspects 552C, 554C, 556C, 558C is arranged in the vertical orientation in which the hair 522C, sweatshirt 524C, undershirt 526C and pants 528C appear on the individual 510C in the photograph 502C.

Additionally, as with the postings 500A, 500B shown in FIGS. 5A and 5B, other information may be extracted from the posting 500C shown in FIG. 5C, including that the person 530C prefers to travel to the location 534C at the date and time 532C, and to perform any activities associated with the posting 500C (i.e., autumn, Halloween, floral decorations). Moreover, and also as with the photographs 502A, 502B shown in FIGS. 5A and 5B, it may be determined that the person 530C prefers to purchase outdoor decorations, based on the floral arrangement 510C identified in the photograph 502C, or clothing or other items for a child, based on the individual 520C identified in the photograph 502C. Such data or information, and any other data or information that may be extracted from the posting 500C, the photograph 502C or the comment section 504C, may then be utilized in recommending one or more items or targeting particular marketing efforts to the person 530C.

Accordingly, upon reviewing a set of social network postings including photographs and/or comments posted by a customer, such as the social network postings 500A, 500B, 500C, the photographs 510A, 510B, 510C and/or the information in the comment sections 530A, 530B, 530C shown in FIGS. 5A, 5B and 5C, several personal tendencies may be deduced regarding the customer. For example, from the photographs 510A, 510B, 510C shown in FIGS. 5A, 5B and it may be determined that the customer prefers traveling to Vermont, Florida and Connecticut, as is described in the stamps 534A, 534B, 534C; that the customer is interested in items for both adults and children approximately one to two years old, as such a child appears in each of the photographs 510A, 510B, 510C; that the customer prefers hats, as is shown in the photographs 510A, 510B; that the customer travels to cold climates in the winter and to warm climates in the spring, as is shown in as is shown in the photographs 510A, 510B; that the customer transitions to autumn-type clothing before the end of September, as is shown in the photograph 510C; and that the customer prefers to decorate with floral arrangements, as is also shown in the photograph 510C. Moreover, the customer's color and texture preferences may also be identified from the photographs 510A, 510B, 510C shown in FIGS. 5A, 5B and 5C.

Each of the personal tendencies that may be deduced or otherwise derived from the social network postings 500A, 500B, 500C shown in FIGS. 5A, 5B and 5C may be used in targeting marketing efforts at specified times of year and in particular locations to the customer by an online marketplace. For example, based on the customer's personal tendencies, as shown in the photographs 502A, 502B, 502C, an online marketplace may offer children's items (e.g., clothing or toys) and gardening supplies (e.g., flowers, plants, fertilizer, tools) throughout the year, as well as winter wear in January, beach wear in the spring, sweatshirts at the beginning of the autumn and hats throughout the year. Moreover, as is shown in the photographs 502A, 502B of FIGS. 5A and 5B, the customer appears to prefer mild combinations of flat, pale tones (e.g., light blue, white, pastel blue) for herself, and strong combinations of bold colors (e.g., blue, red, orange) for her child. Therefore, when providing the customer with product suggestions or recommendations, the online marketplace may choose to display such products recommended for the customer in flat, pale tones, and products recommended for her child in bold colors.

The personal tendencies of a customer that have been identified based on an analysis of a photograph that has been posted to a social network or associated with the customer may be utilized to make product recommendations long after the photograph has been captured or posted to the social network. For example, where a photograph features a child wearing a particular article of clothing, the systems and methods of the present disclosure may recommend a similar article for purchase to a customer after a predetermined period of time, when the child will have outgrown the article of clothing that he or she was wearing when the photograph was captured. Similarly, where a photograph features a known model and year of automobile, the systems and methods of the present disclosure may recommend similar automobiles for purchase to the customer after a predetermined period of time when the automobile featured in the photograph has likely exceeded its useful life.

Figure 6:
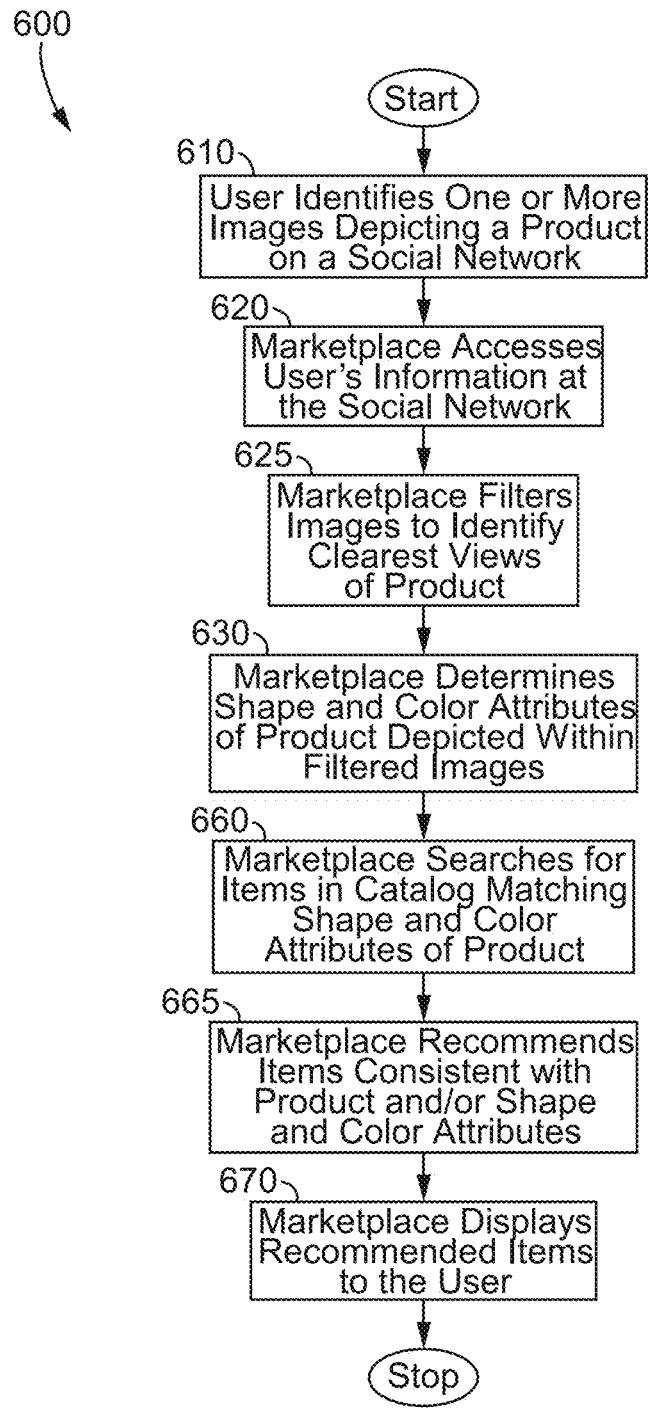
FIG. 6 is a flow chart of a process for matching social media data, in accordance with embodiments of the present disclosure, in accordance with embodiments of the present disclosure.

The systems and methods of the present disclosure may be further used to identify products that are described or depicted in a social network posting that may be associated with a customer, such as products that may be shown in a photograph posted to the social network by the customer or described in a comment on the social network that has been approved or endorsed by the customer, and to market the same or similar products to the customer in the future. Referring to FIG. 6, a flow chart 600 representing one embodiment of a process for matching social media data is shown. Except where otherwise noted, the steps of the flow chart 600 shown in FIG. 6 are similar to corresponding steps of the flow chart 400 shown in FIG. 4 which begin with the number "4," or to corresponding steps of the flow chart 200 shown in FIG. 2 which begin with the number "2."

At step 610, the user identifies one or more images that include a product on a social network. For example, the user may post photographs of a truck to a social network, such as photographs of the user driving or riding in the truck, or photographs of the truck in a showroom. At step 620, an online marketplace may access the user's information at the social network. For example, the social network may access the user's postings, photo libraries or galleries and other information at the social network, and identify the photographs of the truck. At step 625, the marketplace may filter the images to identify the clearest views of the product, and at step 630, the marketplace determines shape and color attributes of the product depicted within the filtered images in order to identify the product with maximum accuracy. For example, the marketplace may selectively filter some or all of the images of the truck in order to identify specific attributes and features of the truck (e.g., the manufacturer, model, year, style and trim of the truck, as well as any additional options or "extras" that may be included with the truck as shown in the images), thereby distinguishing the particular truck shown in the photograph from other like trucks.

At step 660, the online marketplace may search one or more catalogs for recommended items that may correspond with or otherwise relate to the shape attributes and/or the color attributes of the product shown in the images. For example, where the product is identified as a red 1983 Chevrolet S-10 Blazer truck based on the shape attributes and/or color attributes of the product shown in the photograph, the online marketplace may search its catalogs for other, similar trucks, as well as used parts or accessories for the truck. At step 665, the marketplace recommends items that are consistent with the product, the shape attributes and/or the color attributes shown in the photograph. At step 670, the online marketplace displays the recommended items to the user, and the process ends.

Accordingly, the systems and methods of the present disclosure may be utilized to identify products that are shown or described in a user's social network postings, i.e., in photographs or comments that have been posted or endorsed by the user, and to market the same products, or similar or related products, to the user. In such a manner, the systems and methods of the present disclosure may obtain market intelligence regarding a customer, such as the customer's personal preferences and needs, based on information that is available on a social network and utilize that market intelligence, either alone or in combination with other known information, to target one or more particular products to the customer.

Figure 7A:
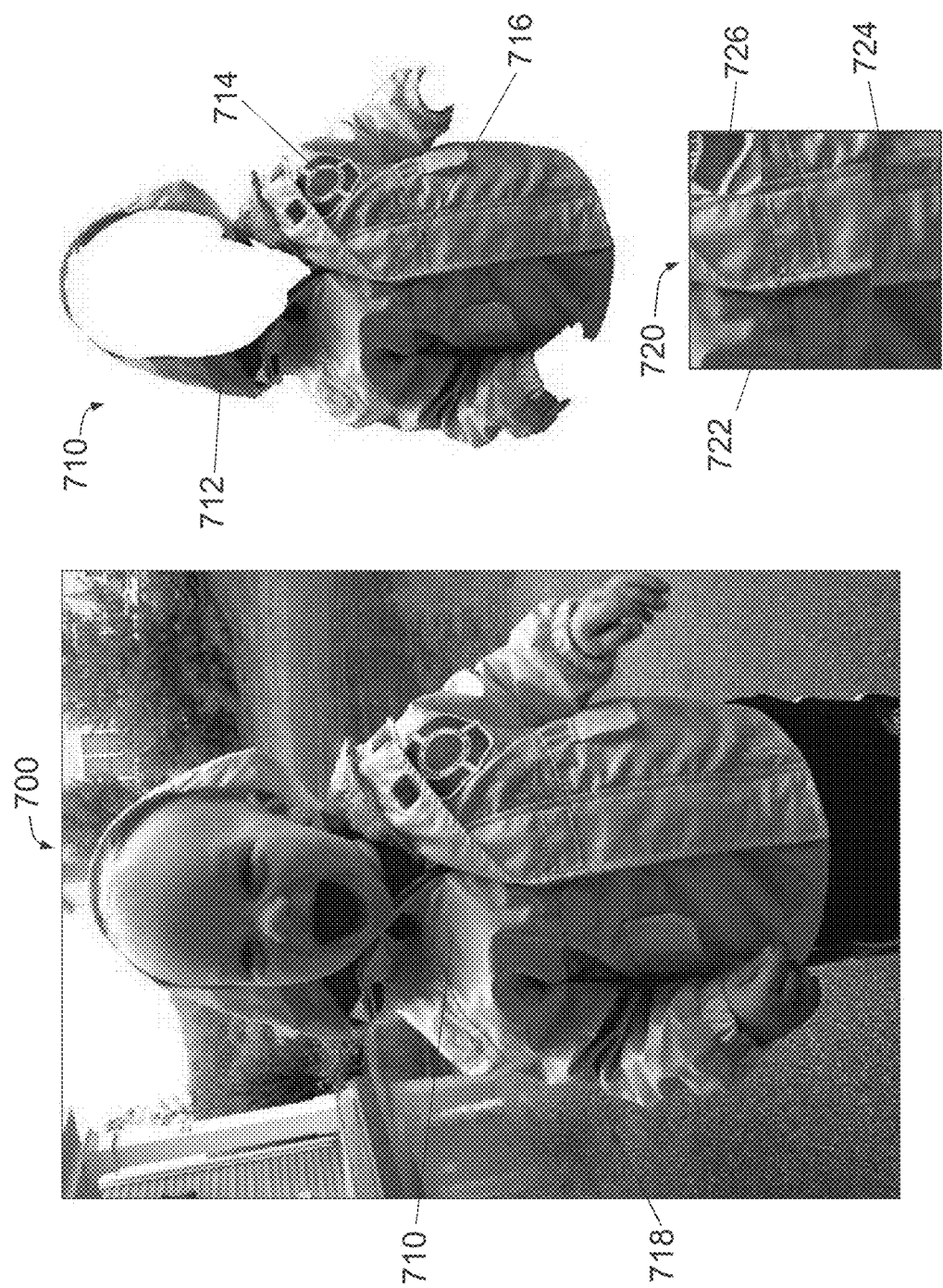
FIGS. 7A and 7B are a photograph provided in an exemplary social media posting and data extracted therefrom, in accordance with embodiments of the present disclosure.
Figure 7B:
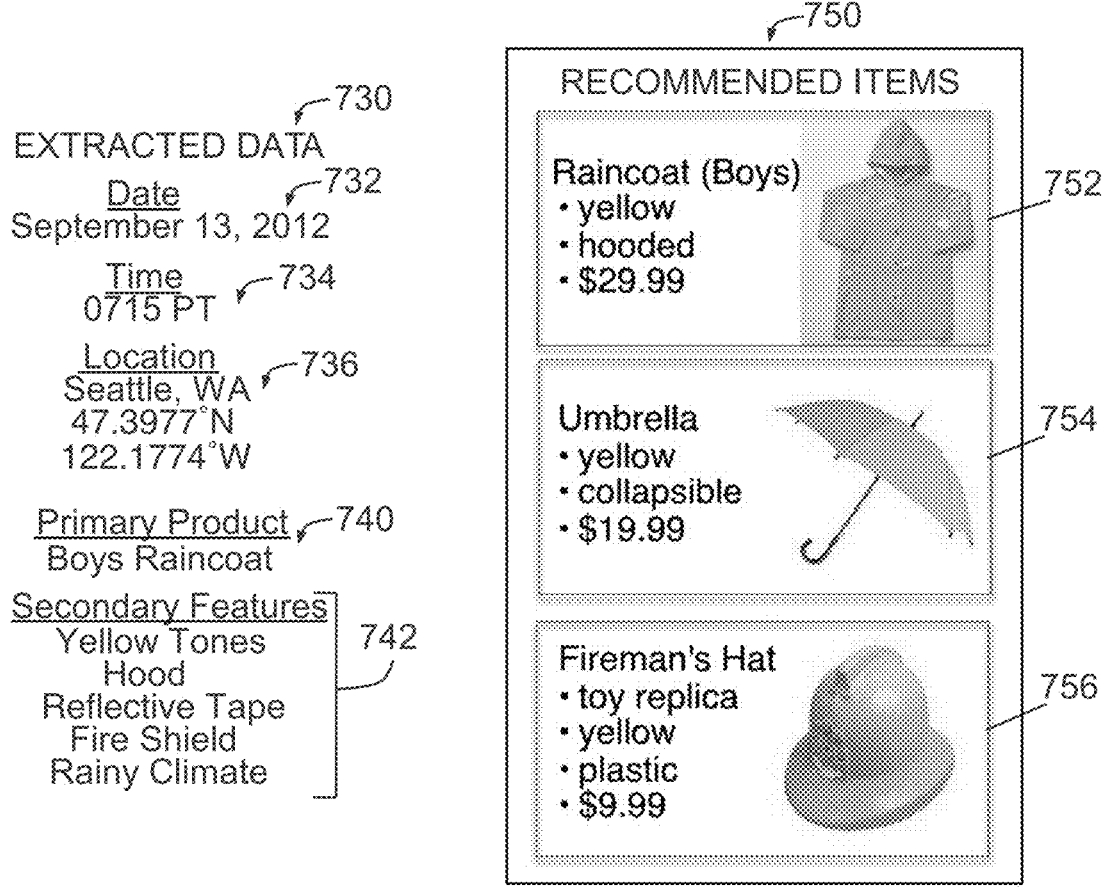

A variety of information regarding a customer's preferences for products may be derived from information posted to a social network, such as a photograph. Referring to FIGS. 7A and 7B, a photograph 700 that has been posted to a social network, an item 710 shown in the photograph 700A, a color and texture palette 720, a set 730 of extracted data, a set 740 of product details and a set 750 of recommended items are shown.

Referring to FIG. 7A, the photograph 700 shows a child's raincoat 710 as being worn by an individual in a rainy environment 718. The raincoat 710 is shown as having a hood 712, a fire shield 714 and a line 716 of reflective tape. The color and texture palette 720 includes an array of colors and textures corresponding to the features of the raincoat 710, depicted in the spatial arrangement in which they appear in the photograph 700, including representative portions 722, 724, 726 showing the colors and textures in areas of the raincoat 710 which were identified in or derived from the photograph 700. Referring to FIG. 7B, a set 730 of data extracted from the photograph, including the date 732, time 734 and location 736 when and where the photograph 700 was captured, and a set 740 of data regarding the raincoat 710 and any secondary features 742 (i.e., information regarding the colors and attributes of the raincoat 710, and the environment 718 in which the raincoat 710 was worn) are also shown.

Based on the data and/or metadata included or associated with the photograph 700, including the color and texture palette 720, the set 730 of extracted data regarding the photograph 710, the product 740 identified therein and the secondary features 742 of the photograph 700, a set 750 of recommended items may be derived. Like the raincoat 710, recommended item 752 is also a yellow child's raincoat that includes a hood. Additionally, recommended item 754 is a yellow umbrella which, like the raincoat 710, is designed to protect a wearer from the elements. Finally, recommended item 754 is a yellow toy fireman's hat, which is identified as related to the raincoat 710 based on the fire shield 714 and the reflective tape 716, and is also designed to be worn by a child.

Accordingly, by processing the contents of a digital photograph that has been posted to a social network by a member, or affiliated with a member of the social network, and identifying any products that may be expressed therein, the systems and methods may recommend the same products, or similar or related products, to the member or to other customers of the social network. Moreover, when presenting the recommended products to the member, the recommended products may be depicted as sharing some or all of the physical attributes of the products expressed in the digital photograph.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. While the present disclosure describes exemplary embodiments that may be associated with online marketplaces that primarily offer articles of clothing for sale, the systems and methods of the present disclosure are not so limited, and may be utilized in connection with any appropriate system. The systems and methods of the present disclosure may be utilized to analyze social network postings regarding any type of goods or services, to extract data from any such postings, and to make recommendations of any type of goods or services to a customer. Additionally, the systems and methods of the present disclosure are not limited to analyzing and extracting data from social network postings, and may be utilized or associated with any Internet-based communications portal, including but not limited to social networks, blogs, photo galleries or photo sharing services, online product rating web sites, or any other web sites at which users may post information including text, images or other media, or any other type of data.

Moreover, the types of goods and/or services that may be recommended to users based on the contents of a digital photograph are not limited to the types of goods and/or services represented in or suggested by the digital photograph. For example, where a digital photograph posted to a social network by a member shows the member wearing a hat associated with a sports team, the systems and methods of the present disclosure may identify the hat as associated with the sports team, and recommend travel packages or tickets to the sports team's games, sporting goods endorsed or worn by the sports team, or other hats or apparel associated with the sports team.

Furthermore, the systems and methods of the present disclosure may be integrated with any type of social network, including but not limited to Facebook®, Twitter® or Google+™ as well as LinkedIn®, Pinterest®, Flickr® or any other social network. Moreover, the information that may be evaluated by the systems and methods of the present disclosure is not limited to photographs or text-based postings. Rather, the systems and methods of the present disclosure may evaluate video files, audio files or any other type or form of media to identify a customer's preferences or tendencies.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 2, 4 and 6, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. An electronic marketplace comprising:
   a first server comprising at least a first data store and at least a first computer processor, wherein the first data store has at least a first set of data regarding a plurality of customer accounts at the electronic marketplace and at least a first set of instructions stored thereon, and
   wherein the first set of instructions, when executed by at least the first computer processor, cause the electronic marketplace to at least:
      receive, over a network, an authorization to access at least a first social network account of a first customer, wherein the authorization is received from at least one computer device associated with the first customer;
      access, over the network, a second server associated with a social network based at least in part on the authorization, wherein the second server comprises at least a second data store and a second computer processor, wherein the second data store has at least a second set of data regarding a plurality of social network accounts at the social network, and wherein the first social network account of the first customer is one of the plurality of social network accounts;

extract, over the network, data regarding at least a first social network posting associated with the first social network account from the second server, wherein the data regarding the first social network posting comprises at least a first image;

derive a color palette based at least in part on the first image, wherein the color palette comprises a plurality of regions, and wherein individual ones of the plurality of regions in the color palette have representative colors;

select a first product based at least in part on at least one of:
  a search for products previously conducted by or on behalf of the first customer account; or
  a second product previously purchased by or on behalf of the first customer account; and transmit, over the network, code for causing a display of information regarding the first product consistent in accordance with the color palette on at least one computer display of the at least one computer device.

2. The electronic marketplace of claim 1, wherein the first set of instructions, when executed by at least the first processor, further cause the electronic marketplace to at least:

identify a plurality of colors expressed within the first image;

determine a proportion of individual ones of the plurality of colors expressed within the first image; and select a geographic location within the first image for the individual ones of the plurality of colors having a predetermined number of highest proportions, wherein the color palette includes the individual ones of the plurality of colors having the predetermined number of the highest proportions in an arrangement corresponding to the geographic locations.

3. The electronic marketplace of claim 2, wherein the first set of instructions, when executed by at least the first processor, further cause the electronic marketplace to at least:

detect an object of interest within the first image, wherein the object of interest is one of:
  a third product depicted within the first image; or
  a person depicted within the first image, wherein at least one of the plurality of regions within the first image corresponds to the third product or the person.

4. The electronic marketplace of claim 2, wherein individual ones of the plurality of regions have a common size.

5. A computer-implemented method comprising:

receiving, from at least one computer device, an authorization to access a first social network account of a first customer of an online marketplace, wherein the authorization is received by a first server associated with the online marketplace over a communications network, wherein the first server comprises at least a first data store and a first processor;

accessing, by the first server, a second server associated with a social network over the communications network, wherein the second server comprises at least a second data store and a second computer processor;

extracting, from the second server by the first server, data associated with the first social network account of the first customer, wherein the data comprises at least one posting associated with the first customer and at least a first image;

deriving, by the first server, a color palette from the first image;

identifying, by the first server, information regarding at least one of a search history or a purchasing history of the first customer, wherein the information regarding the at least one of the search history or the purchasing history is stored in at least the first data store;

selecting, by the first server, at least a first product available via the online marketplace based at least in part on the color palette and the at least one of the search history or the purchasing history; and transmitting, by the first server, code for displaying a first page comprising information regarding at least the first product to the at least one computer device, wherein the first page depicts at least the first product in accordance with the color palette.

6. The computer-implemented method of claim 5, wherein deriving the color palette from the first image comprises:

dividing the first image into a plurality of regions;

selecting representative colors for individual ones of the plurality of regions; and defining the color palette based at least in part on an arrangement of the representative colors selected for at least one of the plurality of regions.

7. The computer-implemented method of claim 6, further comprising:

recognizing at least one object depicted in the first image; and defining a contour of the at least one object;

wherein the at least one of the plurality of regions is within the contour of the at least one object.

8. The computer-implemented method of claim 6, wherein the at least one object is at least one portion of a human body depicted in the first image, wherein the at least one of the plurality of regions corresponds to the at least one portion of the human body depicted in the first image.

9. The computer-implemented method of claim 6, wherein selecting the representative colors for the individual ones of the plurality of regions comprises:

identifying a plurality of colors depicted within the first image, wherein at least one of the plurality of colors depicted within the first image is within one of the plurality of regions;

filtering the plurality of colors depicted within the first image against a plurality of colors of items available at the online marketplace that are stored in the first data store; and selecting the representative colors for the individual ones of the plurality of regions from the filtered plurality of colors depicted within the first image, wherein the first product is displayed in accordance with at least one of the filtered plurality of colors depicted within the first image.

10. The computer-implemented method of claim 6, wherein the color palette comprises at least a first color provided vertically above at least a second color, wherein at least a first portion of the first page is displayed with the first color and at least the second portion of the first page is displayed with the second color, and wherein the first portion of the first page is displayed above the second portion of the second page.

11. A computer-implemented method comprising:

receiving, from at least one computer device, an authorization to access a first social network account of a first customer of an online marketplace, wherein the authorization is received by a first server associated with the online marketplace over a communications network, wherein the first server comprises at least a first data store and a first processor;

accessing, by the first server, a second server associated with a social network over the communications network, wherein the second server comprises at least a second data store and a second computer processor;

extracting, from the second server by the first server, data associated with the first social network account of the first customer, wherein the data comprises at least one posting associated with the first customer and at least a first image;

deriving, by the first server, a color palette from the first image, wherein the color palette comprises at least a first color provided vertically above at least a second color;

identifying, by the first server, information regarding at least one of a search history or a purchasing history of the first customer, wherein the information regarding the at least one of the search history or the purchasing history is stored in at least the first data store;

selecting, by the first server, at least a first product available via the online marketplace based at least in part on the color palette and the at least one of the search history or the purchasing history, wherein the first product is a first article of clothing having the first color;

transmitting, by the first server, code for displaying a first page comprising information regarding at least the first product to the at least one computer device, wherein the first page depicts at least the first product in accordance with the color palette, wherein the first portion of the first page shows the first article of clothing above a second article of clothing having the second color shown in the second portion of the first page, and wherein the first article of clothing is configured for wearing above the second article of clothing on a human body.

12. The computer-implemented method of claim 5, wherein the at least one posting comprises at least one of:
a first posting made by the first customer; or
a second posting made by a member of the social network other than the first customer, wherein the second posting identifies the first customer or was endorsed by the first customer.

13. The computer-implemented method of claim 5, wherein defining the color palette based at least in part on the arrangement of the representative colors selected for the at least one of the plurality of regions comprises:
identifying a plurality of colors depicted within the first image;
determining, for individual ones of the plurality of colors, proportions of the color depicted within the first image; and
selecting sizes for individual ones of the plurality of regions based at least in part on the proportions of the plurality of colors depicted within the first image.

14. The computer-implemented method of claim 5, further comprising:
recognizing at least one object depicted in the first image, wherein the first product available via the online marketplace is selected based at least in part on the at least one object depicted in the first image.

15. The computer-implemented method of claim 5, further comprising:
identifying at least one of an activity or a location based at least in part on the at least one posting associated with the first customer;
wherein the first product available via the online marketplace is selected based at least in part on the activity or the location.

16. A system comprising:
a first server comprising at least a first data store and at least a first computer processor, wherein the first data store has at least a first set of data regarding a plurality of customer accounts at the electronic marketplace and at least a first set of instructions stored thereon, and
wherein the first set of instructions, when executed by at least the first computer processor, cause the electronic marketplace to at least:
receive, over a network, an authorization to access at least a first social network account of a first customer, wherein the authorization is received from at least one computer device associated with the first customer;
access, over the network, a second server associated with a social network based at least in part on the authorization, wherein the second server comprises at least a second data store and a second computer processor, wherein the second data store has at least a second set of data regarding a plurality of social network accounts at the social network, and wherein the first social network account of the first customer is one of the plurality of social network accounts;
extract, over the network, data regarding at least a first social network posting associated with the first social network account from the second server, wherein the data regarding the first social network posting comprises at least a first image;
determine a first plurality of preferences of the first customer based at least in part on the extracted data;
select a first product based at least in part on at least one of the first plurality of preferences and at least one of:
a search for products previously conducted by or on behalf of the first customer account; or
a second product previously purchased by or on behalf of the first customer account; and
transmit, over the network, code for causing a display of information regarding the first product on at least one computer display of the at least one computer device.

17. The system of claim 16, wherein the first set of instructions, when executed by at least the first computer processor, further cause the electronic marketplace to at least:
derive a color palette based at least in part on the first image, wherein the color palette comprises a plurality of regions,
wherein individual ones of the plurality of regions in the color palette have representative colors,
wherein the first plurality of preferences comprises the color palette.

18. The system of claim 16, wherein the data regarding at least the first social network posting comprises a date associated with at least one of the first social network posting or the first image, a time associated with at least one of the first social network posting or the first image and a location associated with at least one of the first social network posting or the first image, and wherein the first set of instructions, when executed by at least the first computer processor, further cause the electronic marketplace to at least:
define a tendency of the first customer based at least in part on the data regarding at least the first social network posting,
wherein the first product is selected based at least in part on the tendency.

19. The system of claim 16, wherein the first posting is made by at least one of:
the first customer; or
a member of the social network other than the first customer, wherein the first posting identifies the first customer or was endorsed by the first customer.

20. The system of claim 16, wherein the first set of instructions, when executed by at least the first computer processor, further cause the electronic marketplace to at least:
identify a second plurality of preferences of the first customer, wherein the second plurality of preferences comprises at least one of:
a color of at least the second product;
a texture of at least the second product;
a price point of at least the second product;
a model of at least the second product;
a shape of at least the second product;
an attribute of at least the second product;
an intended use of at least the second product; or
a date on which the second product was previously purchased by or on behalf of the first customer account,
wherein the first product is selected based at least in part on at least one of the second plurality of preferences of the first customer.

* * * * *